United States Patent
Flockhart et al.

(10) Patent No.: US 7,787,609 B1
(45) Date of Patent: Aug. 31, 2010

(54) PRIORITIZED SERVICE DELIVERY BASED ON PRESENCE AND AVAILABILITY OF INTERRUPTIBLE ENTERPRISE RESOURCES WITH SKILLS

(75) Inventors: Andrew D. Flockhart, Thornton, CO (US); Robin H. Foster, Little Silver, NJ (US); Eugene P. Mathews, Marco Island, FL (US); Jill K. Ross, Golden, CO (US); John Z. Taylor, Bedminster, NJ (US); Rodney A. Thomson, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 1055 days.

(21) Appl. No.: 11/245,724

(22) Filed: Oct. 6, 2005

(51) Int. Cl.
*H04M 3/00* (2006.01)
*H04M 5/00* (2006.01)

(52) U.S. Cl. .............. 379/265.01; 379/265.1; 379/265.11; 379/265.12; 379/266.01; 379/309

(58) Field of Classification Search ............ 379/265.01, 379/265.1, 265.11, 265.12, 266.01, 309
See application file for complete search history.

(56) References Cited

U.S. PATENT DOCUMENTS

| | | |
|---|---|---|
| 4,163,124 A | 7/1979 | Jolissaint |
| 4,510,351 A | 4/1985 | Costello et al. |
| 4,567,323 A | 1/1986 | Lottes et al. |
| 4,737,983 A | 4/1988 | Frauenthal et al. |
| 4,797,911 A | 1/1989 | Szlam et al. |
| 4,894,857 A | 1/1990 | Szlam et al. |
| 5,001,710 A | 3/1991 | Gawrys et al. |
| 5,097,528 A | 3/1992 | Gursahaney et al. |
| 5,101,425 A | 3/1992 | Darland |
| 5,155,761 A | 10/1992 | Hammond |
| 5,164,981 A | 11/1992 | Mitchell et al. |
| 5,164,983 A | 11/1992 | Brown et al. |
| 5,167,010 A | 11/1992 | Elm et al. |
| 5,185,780 A | 2/1993 | Leggett |
| 5,206,903 A | 4/1993 | Kohler et al. |

(Continued)

FOREIGN PATENT DOCUMENTS

CA 2143198 1/1995

(Continued)

OTHER PUBLICATIONS

"Product Features," *Guide to Call Center Automation*, Brock Control Systems, Inc., Activity Managers Series™, Section 5—Company B120, p. 59, 1992.

(Continued)

*Primary Examiner*—Quynh H Nguyen
(74) *Attorney, Agent, or Firm*—Sheridan Ross P.C.

(57) ABSTRACT

The present invention is directed to a contact center using presence information to direct work items to experts. More specifically, a system is provided that includes a feature that allows for subject matter experts, which are individuals other than customer service agents, to assist in incoming calls in at least three different modes: an assist mode, an intercept mode and an overflow mode. Thus, customer service efficiency and customer satisfaction are increased. In addition, it is contemplated that subject matter experts may either selectively accept or deny the request for assistance.

22 Claims, 5 Drawing Sheets

U.S. PATENT DOCUMENTS

| | | |
|---|---|---|
| 5,210,789 A | 5/1993 | Jeffus et al. |
| 5,274,700 A | 12/1993 | Gechter et al. |
| 5,278,898 A | 1/1994 | Cambray et al. |
| 5,289,368 A | 2/1994 | Jordan et al. |
| 5,291,550 A | 3/1994 | Levy et al. |
| 5,299,260 A | 3/1994 | Shaio |
| 5,309,513 A | 5/1994 | Rose |
| 5,325,292 A | 6/1994 | Crockett |
| 5,335,268 A | 8/1994 | Kelly, Jr. et al. |
| 5,335,269 A | 8/1994 | Steinlicht |
| 5,390,243 A | 2/1995 | Casselman et al. |
| 5,436,965 A | 7/1995 | Grossman et al. |
| 5,444,774 A | 8/1995 | Friedes |
| 5,467,391 A | 11/1995 | Donaghue, Jr. et al. |
| 5,469,503 A | 11/1995 | Butensky et al. |
| 5,469,504 A | 11/1995 | Blaha |
| 5,473,773 A | 12/1995 | Aman et al. |
| 5,479,497 A | 12/1995 | Kovarik |
| 5,499,291 A | 3/1996 | Kepley |
| 5,500,795 A | 3/1996 | Powers et al. |
| 5,504,894 A | 4/1996 | Ferguson et al. |
| 5,506,898 A | 4/1996 | Costantini et al. |
| 5,530,744 A | 6/1996 | Charalambous et al. |
| 5,537,470 A | 7/1996 | Lee |
| 5,537,542 A | 7/1996 | Eilert et al. |
| 5,544,232 A | 8/1996 | Baker et al. |
| 5,546,452 A | 8/1996 | Andrews et al. |
| 5,555,299 A | 9/1996 | Maloney et al. |
| 5,577,169 A | 11/1996 | Prezioso |
| 5,592,378 A | 1/1997 | Cameron et al. |
| 5,592,542 A | 1/1997 | Honda et al. |
| 5,594,726 A | 1/1997 | Thompson et al. |
| 5,603,029 A | 2/1997 | Aman et al. |
| 5,604,892 A | 2/1997 | Nuttall et al. |
| 5,606,361 A | 2/1997 | Davidsohn et al. |
| 5,611,076 A | 3/1997 | Durflinger et al. |
| 5,627,884 A | 5/1997 | Williams et al. |
| 5,642,515 A | 6/1997 | Jones et al. |
| 5,684,872 A | 11/1997 | Flockhart et al. |
| 5,684,874 A | 11/1997 | Yagyu et al. |
| 5,684,964 A | 11/1997 | Powers et al. |
| 5,689,698 A | 11/1997 | Jones et al. |
| 5,703,943 A | 12/1997 | Otto |
| 5,713,014 A | 1/1998 | Durflinger et al. |
| 5,721,770 A | 2/1998 | Kohler |
| 5,724,092 A | 3/1998 | Davidsohn et al. |
| 5,740,238 A | 4/1998 | Flockhart et al. |
| 5,742,675 A | 4/1998 | Kilander et al. |
| 5,742,763 A | 4/1998 | Jones |
| 5,748,468 A | 5/1998 | Notenboom et al. |
| 5,749,079 A | 5/1998 | Yong et al. |
| 5,751,707 A | 5/1998 | Voit et al. |
| 5,752,027 A | 5/1998 | Familiar |
| 5,754,639 A | 5/1998 | Flockhart et al. |
| 5,754,776 A | 5/1998 | Hales et al. |
| 5,754,841 A | 5/1998 | Carino, Jr. |
| 5,757,904 A | 5/1998 | Anderson |
| 5,784,452 A | 7/1998 | Carney |
| 5,790,642 A | 8/1998 | Taylor et al. |
| 5,790,650 A | 8/1998 | Dunn et al. |
| 5,790,677 A | 8/1998 | Fox et al. |
| 5,794,250 A | 8/1998 | Carino, Jr. et al. |
| 5,796,393 A | 8/1998 | MacNaughton et al. |
| 5,802,282 A | 9/1998 | Hales et al. |
| 5,802,510 A | 9/1998 | Jones |
| 5,818,907 A | 10/1998 | Maloney et al. |
| 5,819,084 A | 10/1998 | Shapiro et al. |
| 5,825,869 A | 10/1998 | Brooks et al. |
| 5,826,039 A | 10/1998 | Jones |
| 5,828,747 A | 10/1998 | Fisher et al. |
| 5,836,011 A | 11/1998 | Hambrick et al. |
| 5,838,968 A | 11/1998 | Culbert |
| 5,839,117 A | 11/1998 | Cameron et al. |
| 5,864,874 A | 1/1999 | Shapiro |
| 5,875,437 A | 2/1999 | Atkins |
| 5,880,720 A | 3/1999 | Iwafune et al. |
| 5,881,238 A | 3/1999 | Aman et al. |
| 5,884,032 A | 3/1999 | Bateman et al. |
| 5,889,956 A | 3/1999 | Hauser et al. |
| 5,897,622 A | 4/1999 | Blinn et al. |
| 5,903,641 A | 5/1999 | Tonisson |
| 5,903,877 A | 5/1999 | Berkowitz et al. |
| 5,905,793 A | 5/1999 | Flockhart et al. |
| 5,909,669 A | 6/1999 | Havens |
| 5,911,134 A | 6/1999 | Castonguay et al. |
| 5,914,951 A | 6/1999 | Bentley et al. |
| 5,915,012 A | 6/1999 | Miloslavsky |
| 5,923,745 A | 7/1999 | Hurd |
| 5,926,538 A | 7/1999 | Deryugin et al. |
| 5,930,786 A | 7/1999 | Carino, Jr. et al. |
| 5,937,051 A | 8/1999 | Hurd et al. |
| 5,937,402 A | 8/1999 | Pandit |
| 5,940,496 A | 8/1999 | Gisby et al. |
| 5,943,416 A | 8/1999 | Gisby |
| 5,948,065 A | 9/1999 | Eilert et al. |
| 5,960,073 A | 9/1999 | Kikinis et al. |
| 5,963,635 A | 10/1999 | Szlam et al. |
| 5,963,911 A | 10/1999 | Walker et al. |
| 5,970,132 A | 10/1999 | Brady |
| 5,974,135 A | 10/1999 | Breneman et al. |
| 5,974,462 A | 10/1999 | Aman et al. |
| 5,982,873 A | 11/1999 | Flockhart et al. |
| 5,987,117 A | 11/1999 | McNeil et al. |
| 5,991,392 A | 11/1999 | Miloslavsky |
| 5,996,013 A | 11/1999 | Delp et al. |
| 5,999,963 A | 12/1999 | Bruno et al. |
| 6,000,832 A | 12/1999 | Franklin et al. |
| 6,011,844 A | 1/2000 | Uppaluru et al. |
| 6,014,437 A | 1/2000 | Acker et al. |
| 6,031,896 A | 2/2000 | Gardell et al. |
| 6,038,293 A | 3/2000 | McNerney et al. |
| 6,038,296 A | 3/2000 | Brunson et al. |
| 6,044,144 A | 3/2000 | Becker et al. |
| 6,044,205 A | 3/2000 | Reed et al. |
| 6,044,355 A | 3/2000 | Crockett et al. |
| 6,049,547 A | 4/2000 | Fisher et al. |
| 6,049,779 A | 4/2000 | Berkson |
| 6,052,723 A | 4/2000 | Ginn |
| 6,055,308 A | 4/2000 | Miloslavsky et al. |
| 6,064,730 A | 5/2000 | Ginsberg |
| 6,064,731 A | 5/2000 | Flockhart et al. |
| 6,084,954 A | 7/2000 | Harless |
| 6,088,441 A | 7/2000 | Flockhart et al. |
| 6,108,670 A | 8/2000 | Weida et al. |
| 6,115,462 A | 9/2000 | Servi et al. |
| 6,128,304 A | 10/2000 | Gardell et al. |
| 6,151,571 A | 11/2000 | Pertrushin |
| 6,154,769 A | 11/2000 | Cherkasova et al. |
| 6,163,607 A | 12/2000 | Bogart et al. |
| 6,173,053 B1 | 1/2001 | Bogart et al. |
| 6,175,564 B1 | 1/2001 | Miloslavsky et al. |
| 6,178,441 B1 | 1/2001 | Elnozahy |
| 6,185,292 B1 | 2/2001 | Miloslavsky |
| 6,185,603 B1 | 2/2001 | Henderson et al. |
| 6,192,122 B1 | 2/2001 | Flockhart et al. |
| 6,215,865 B1 | 4/2001 | McCalmont |
| 6,226,377 B1 | 5/2001 | Donaghue, Jr. |
| 6,229,819 B1 | 5/2001 | Darland et al. |
| 6,230,183 B1 | 5/2001 | Yocom et al. |
| 6,233,333 B1 | 5/2001 | Dezonmo |
| 6,240,417 B1 | 5/2001 | Eastwick |
| 6,259,969 B1 | 7/2001 | Tackett et al. |
| 6,263,359 B1 | 7/2001 | Fong et al. |
| 6,272,544 B1 | 8/2001 | Mullen |

| | | | | | | |
|---|---|---|---|---|---|---|
| 6,275,806 B1 | 8/2001 | Pertrushin | | 6,988,126 B2 | 1/2006 | Wilcock et al. |
| 6,275,812 B1 | 8/2001 | Haq et al. | | 7,010,542 B2 | 3/2006 | Trappen et al. |
| 6,275,991 B1 | 8/2001 | Erlin | | 7,020,254 B2 * | 3/2006 | Phillips ................ 379/114.04 |
| 6,278,777 B1 | 8/2001 | Morley | | 7,039,176 B2 | 5/2006 | Borodow et al. |
| 6,292,550 B1 | 9/2001 | Burritt | | 7,062,031 B2 | 6/2006 | Becerra et al. |
| 6,295,353 B1 | 9/2001 | Flockhart et al. | | 7,076,051 B2 | 7/2006 | Brown et al. |
| 6,298,062 B1 | 10/2001 | Gardell et al. | | 7,100,200 B2 | 8/2006 | Pope et al. |
| 6,307,931 B1 | 10/2001 | Vaudreuil | | 7,110,525 B1 | 9/2006 | Heller et al. |
| 6,324,282 B1 | 11/2001 | McIllwaine et al. | | 7,117,193 B1 | 10/2006 | Basko et al. |
| 6,332,081 B1 | 12/2001 | Do | | 7,136,873 B2 | 11/2006 | Smith et al. |
| 6,339,754 B1 | 1/2002 | Flanagan et al. | | 7,149,733 B2 | 12/2006 | Lin et al. |
| 6,353,810 B1 | 3/2002 | Petrushin | | 7,155,612 B2 | 12/2006 | Licis |
| 6,356,632 B1 | 3/2002 | Foster et al. | | 7,158,628 B2 | 1/2007 | McConnell et al. |
| 6,360,222 B1 | 3/2002 | Quinn | | 7,162,469 B2 | 1/2007 | Anonsen et al. |
| 6,366,666 B2 | 4/2002 | Bengtson et al. | | 7,165,075 B2 | 1/2007 | Harter et al. |
| 6,366,668 B1 | 4/2002 | Borst et al. | | 7,170,976 B1 | 1/2007 | Keagy |
| 6,389,028 B1 | 5/2002 | Bondarenko et al. | | 7,170,992 B2 | 1/2007 | Knott et al. |
| 6,389,132 B1 | 5/2002 | Price | | 7,177,401 B2 | 2/2007 | Mundra et al. |
| 6,389,400 B1 | 5/2002 | Bushey et al. | | 7,203,655 B2 | 4/2007 | Herbert et al. |
| 6,411,682 B1 | 6/2002 | Fuller et al. | | 7,212,625 B1 | 5/2007 | McKenna et al. |
| 6,424,709 B1 | 7/2002 | Doyle et al. | | 7,215,744 B2 | 5/2007 | Scherer |
| 6,426,950 B1 | 7/2002 | Mistry | | 7,257,597 B1 | 8/2007 | Pryce et al. |
| 6,427,137 B2 | 7/2002 | Petrushin | | 7,266,508 B1 | 9/2007 | Owen et al. |
| 6,430,282 B1 | 8/2002 | Bannister et al. | | 7,324,954 B2 | 1/2008 | Calderaro et al. |
| 6,434,230 B1 | 8/2002 | Gabriel | | 7,340,408 B1 | 3/2008 | Drew et al. |
| 6,446,092 B1 | 9/2002 | Sutter | | 7,376,127 B2 | 5/2008 | Hepworth et al. |
| 6,449,356 B1 | 9/2002 | Dezonno | | 7,392,402 B2 | 6/2008 | Suzuki |
| 6,449,358 B1 | 9/2002 | Anisimov et al. | | 7,418,093 B2 | 8/2008 | Knott et al. |
| 6,449,646 B1 | 9/2002 | Sikora et al. | | 7,545,925 B2 | 6/2009 | Williams |
| 6,453,038 B1 | 9/2002 | McFarlane et al. | | 2001/0011228 A1 | 8/2001 | Shenkman |
| 6,463,148 B1 | 10/2002 | Brady | | 2001/0019816 A1 | 9/2001 | Kumar |
| 6,463,346 B1 | 10/2002 | Flockhart et al. | | 2001/0042126 A1 | 11/2001 | Wong et al. |
| 6,463,415 B2 | 10/2002 | St. John | | 2001/0053214 A1 | 12/2001 | Kleinoder et al. |
| 6,480,826 B2 | 11/2002 | Pertrushin | | 2001/0054037 A1 | 12/2001 | Shapiro et al. |
| 6,490,350 B2 | 12/2002 | McDuff et al. | | 2001/0056349 A1 | 12/2001 | St. John |
| 6,535,600 B1 | 3/2003 | Fisher et al. | | 2002/0002460 A1 | 1/2002 | Pertrushin |
| 6,535,601 B1 | 3/2003 | Flockhart et al. | | 2002/0002464 A1 | 1/2002 | Petrushin |
| 6,553,114 B1 | 4/2003 | Fisher et al. | | 2002/0010587 A1 | 1/2002 | Pertrushin |
| 6,556,974 B1 | 4/2003 | D'Alessandro | | 2002/0012186 A1 | 1/2002 | Nakamura et al. |
| 6,560,330 B2 | 5/2003 | Gabriel | | 2002/0019829 A1 | 2/2002 | Shapiro |
| 6,560,649 B1 | 5/2003 | Mullen et al. | | 2002/0021307 A1 | 2/2002 | Glenn et al. |
| 6,560,707 B2 | 5/2003 | Curtis et al. | | 2002/0035594 A1 | 3/2002 | Dreke et al. |
| 6,563,920 B1 | 5/2003 | Flockhart et al. | | 2002/0035605 A1 | 3/2002 | McDowell et al. |
| 6,571,285 B1 | 5/2003 | Groath et al. | | 2002/0038422 A1 | 3/2002 | Suwamoto et al. |
| 6,574,599 B1 | 6/2003 | Lim et al. | | 2002/0055975 A1 | 5/2002 | Petrovykh |
| 6,574,605 B1 | 6/2003 | Sanders et al. | | 2002/0065894 A1 | 5/2002 | Dalal et al. |
| 6,597,685 B2 | 7/2003 | Miloslavsky et al. | | 2002/0076010 A1 | 6/2002 | Sahai |
| 6,603,854 B1 | 8/2003 | Judkins et al. | | 2002/0083127 A1 | 6/2002 | Agrawal |
| 6,604,084 B1 | 8/2003 | Powers et al. | | 2002/0085701 A1 | 7/2002 | Parsons et al. |
| 6,614,903 B1 | 9/2003 | Flockhart et al. | | 2002/0086672 A1 | 7/2002 | McDowell et al. |
| 6,650,748 B1 | 11/2003 | Edwards et al. | | 2002/0087630 A1 | 7/2002 | Wu |
| 6,704,409 B1 | 3/2004 | Dilip et al. | | 2002/0097856 A1 | 7/2002 | Wullert, II |
| 6,707,903 B2 | 3/2004 | Flockhart et al. | | 2002/0112186 A1 | 8/2002 | Ford et al. |
| 6,711,253 B1 | 3/2004 | Prabhaker | | 2002/0116336 A1 | 8/2002 | Diacakis et al. |
| 6,735,299 B2 | 5/2004 | Krimstock et al. | | 2002/0116461 A1 | 8/2002 | Diacakis et al. |
| 6,735,593 B1 | 5/2004 | Williams | | 2002/0118816 A1 | 8/2002 | Flockhart et al. |
| 6,738,462 B1 | 5/2004 | Brunson | | 2002/0120687 A1 | 8/2002 | Diacakis et al. |
| 6,754,333 B1 | 6/2004 | Flockhart et al. | | 2002/0123923 A1 | 9/2002 | Manganaris et al. |
| 6,757,362 B1 | 6/2004 | Cooper et al. | | 2002/0181692 A1 | 12/2002 | Flockhart et al. |
| 6,766,013 B2 | 7/2004 | Flockhart et al. | | 2002/0194002 A1 | 12/2002 | Pertrushin |
| 6,766,014 B2 | 7/2004 | Flockhart et al. | | 2003/0014491 A1 | 1/2003 | Horvitz et al. |
| 6,766,326 B1 | 7/2004 | Cena | | 2003/0028621 A1 | 2/2003 | Furlong et al. |
| 6,775,377 B2 | 8/2004 | McIllwaine et al. | | 2003/0073440 A1 | 4/2003 | Mukherjee et al. |
| 6,785,666 B1 | 8/2004 | Nareddy et al. | | 2003/0108186 A1 * | 6/2003 | Brown et al. ........... 379/266.01 |
| 6,822,945 B2 | 11/2004 | Petrovykh | | 2003/0123642 A1 | 7/2003 | Alvarado et al. |
| 6,829,348 B1 | 12/2004 | Schroeder et al. | | 2003/0144900 A1 | 7/2003 | Whitmer |
| 6,842,503 B1 | 1/2005 | Wildfeuer | | 2003/0144959 A1 | 7/2003 | Makita |
| 6,847,973 B2 | 1/2005 | Griffin et al. | | 2003/0152212 A1 | 8/2003 | Burok et al. |
| 6,898,190 B2 * | 5/2005 | Shtivelman et al. ......... 370/270 | | 2003/0174830 A1 | 9/2003 | Boyer et al. |
| 6,915,305 B2 | 7/2005 | Subramanian et al. | | 2003/0177017 A1 | 9/2003 | Boyer et al. |
| 6,947,988 B1 | 9/2005 | Saleh | | 2003/0177231 A1 | 9/2003 | Flockhart et al. |
| 6,981,061 B1 | 12/2005 | Sakakura | | 2003/0231757 A1 | 12/2003 | Harkreader et al. |
| 6,985,901 B1 | 1/2006 | Sachse et al. | | 2004/0008828 A1 | 1/2004 | Coles et al. |

| | | | |
|---|---|---|---|
| 2004/0015496 A1 | 1/2004 | Anonsen | |
| 2004/0015506 A1 | 1/2004 | Anonsen et al. | |
| 2004/0054743 A1 | 3/2004 | McPartlan et al. | |
| 2004/0057569 A1 | 3/2004 | Busey et al. | |
| 2004/0103324 A1 | 5/2004 | Band | |
| 2004/0138944 A1 | 7/2004 | Whitacre et al. | |
| 2004/0162998 A1 | 8/2004 | Tuomi et al. | |
| 2004/0202309 A1 | 10/2004 | Baggenstoss et al. | |
| 2004/0203878 A1 | 10/2004 | Thomson | |
| 2004/0210475 A1 | 10/2004 | Starnes et al. | |
| 2004/0240659 A1* | 12/2004 | Gagle et al. | 379/265.01 |
| 2004/0249650 A1 | 12/2004 | Freedman et al. | |
| 2004/0260706 A1 | 12/2004 | Anonsen et al. | |
| 2005/0021529 A1 | 1/2005 | Hodson et al. | |
| 2005/0027612 A1 | 2/2005 | Walker et al. | |
| 2005/0044375 A1 | 2/2005 | Paatero et al. | |
| 2005/0091071 A1 | 4/2005 | Lee | |
| 2005/0125432 A1 | 6/2005 | Lin et al. | |
| 2005/0125458 A1 | 6/2005 | Sutherland et al. | |
| 2005/0138064 A1 | 6/2005 | Trappen et al. | |
| 2005/0154708 A1 | 7/2005 | Sun | |
| 2005/0182784 A1 | 8/2005 | Trappen et al. | |
| 2005/0289446 A1 | 12/2005 | Moncsko et al. | |
| 2006/0004686 A1 | 1/2006 | Molnar et al. | |
| 2006/0007916 A1 | 1/2006 | Jones et al. | |
| 2006/0026049 A1 | 2/2006 | Joseph et al. | |
| 2006/0056598 A1 | 3/2006 | Brandt et al. | |
| 2006/0135058 A1 | 6/2006 | Karabinis | |
| 2006/0178994 A1 | 8/2006 | Stolfo et al. | |
| 2006/0242160 A1 | 10/2006 | Kanchwalla et al. | |
| 2006/0256957 A1 | 11/2006 | Fain et al. | |
| 2006/0271418 A1 | 11/2006 | Hackbarth et al. | |
| 2007/0038632 A1 | 2/2007 | Engstrom | |
| 2007/0064912 A1* | 3/2007 | Kagan et al. | 379/265.1 |
| 2007/0083572 A1 | 4/2007 | Bland et al. | |
| 2007/0112953 A1 | 5/2007 | Barnett | |
| 2007/0127643 A1 | 6/2007 | Keagy | |
| 2007/0192414 A1* | 8/2007 | Chen et al. | 709/205 |
| 2007/0201311 A1 | 8/2007 | Olson | |
| 2007/0201674 A1* | 8/2007 | Annadata et al. | 379/265.01 |
| 2007/0230681 A1 | 10/2007 | Boyer et al. | |
| 2008/0056165 A1 | 3/2008 | Petrovykh | |

FOREIGN PATENT DOCUMENTS

| | | |
|---|---|---|
| CA | 2174762 | 6/1995 |
| EP | 0 501 189 A2 | 9/1992 |
| EP | 0 740 450 A2 | 10/1996 |
| EP | 0770967 | 5/1997 |
| EP | 0772335 | 5/1997 |
| EP | 0855826 | 7/1998 |
| EP | 0 863 651 A2 | 9/1998 |
| EP | 0829996 A2 | 9/1998 |
| EP | 0866407 A1 | 9/1998 |
| EP | 899673 A2 | 3/1999 |
| EP | 998108 A1 | 5/2000 |
| EP | 1035718 | 9/2000 |
| EP | 1091307 A2 | 4/2001 |
| EP | 1150236 | 10/2001 |
| GB | 2 273 418 | 6/1994 |
| GB | 2 290 192 A | 12/1995 |
| JP | 2001-053843 | 2/2001 |
| JP | 2006-054864 | 2/2006 |
| WO | WO 96/07141 | 3/1996 |
| WO | WO 97/28635 | 8/1997 |
| WO | WO 98/56207 | 12/1998 |
| WO | WO 99/17522 | 4/1999 |
| WO | WO 01/80094 | 10/2001 |
| WO | WO 02/099640 | 12/2002 |

OTHER PUBLICATIONS

"Product Features," *Guide to Call Center Automation*, CRC Information Systems, Inc., Tel-Athena, Section 5—Company C520, p. 95, 1992.

Dawson, "NPRI's Powerguide, Software Overview" *Call Center Magazine* (Jun. 1993), p. 85.

"Applications, NPRI's Predictive Dialing Package," *Computer Technology* (Fall 1993), p. 86.

"VAST™, Voicelink Application Software for Teleservicing®," *System Manager User's Guide*, Digital Systems (1994), pp. ii, vii-ix, 1-2, 2-41 through 2-77.

GEOTEL Communications Corporation Web printout entitled "Intelligent CallRouter". Optimizing the interaction Between Customers and Answering Resources. 6 pages, Oct. 6, 2005.

L.F. Lamel and J.L. Gauvain, Language Identification Using Phone-Based Acoustic Likelihood, ICASSP-94, 4 pages, Oct. 6, 2005.

John H.L. Hansen and Levent M. Arsian, Foreign Accent Classification Using Source Generator Based Prosodic Features, IEEE Proc. ICASSP, vol. 1, pp. 836-839, Detroit USA (May 1995).

Levent M. Arsian and John H.L. Hansen, Language Accent Classification in American English, Robust Speech Processing Laboratory, Duke University Department of Electrical Engineering, Durham, NC, Technical Report RSPL-96-7, revised Jan. 29, 1996. pp. 1-16.

Levent M. Arsian, Foreign Accent Classification in American English, Department of Electrical Computer Engineering, Duke University, Thesis, pp. 1-200 (1996).

E. Noth et al., "Research Issues for the Next Generation Spoken": University of Erlangen-Nuremberg, Bavarian Research Centre for Knowledge-Based Systems, at http://www5.informatik.uni-erlangen.de/literature/psdir/1999/Noeth99:RIF.ps.gz 16 pages, Oct. 6, 2005.

Presentation by Victor Zue, The MIT Ox90ygen Project, MIT Laboratory for Computer Science (Apr. 25-26, 2000) 9 pages.

MIT Project Oxygen, Pervasive, Human-Centered Computing (MIT Laboratory for Computer Science) (Jun. 2000) pp. 1-15.

Examiner's Refusal Decision dated Jul. 4, 2005 in Japanese Patent App. No. 2000-34266.

Examiner's Refusal Decision for Japanese Patent Application No. 2000-34267 dated Mar. 9, 2005 with translation, 4 pages.

Avaya, Inc. Business Advocate Product Summary, at http://www.avaya.com, downloaded on Feb. 15, 2003, Avaya, Inc. 2003, 3 pages.

Avaya, Inc. Business Advocate Options, at http://www.avaya.com, downloaded on Feb. 15, 2003, Avaya, Inc. 2003.

Avaya, Inc. CentreVu Advocate, Release 9, User Guide, Dec. 2000, 211 pages.

"Internet Protocol Addressing," available at http://samspade.org/d/ipdns.html, downloaded Mar. 31, 2003, 9 pages.

"Domain Name Services," available at http://www.pism.com/chapt09/chapt09.html, downloaded Mar. 31, 2003, 21 pages.

Bellsouth Corp., "Frequently Asked Questions—What is a registrar?," available at https://registration.bellsouth.net/NASApp/DNSWebUI/FAQ.jsp, downloaded Mar. 31, 2003, 4 pages.

Ahmed, Sarah, "A Scalable Byzantine Fault Tolerant Secure Domain Name System," thesis submitted to Massachusetts Institute of Technology, Department of Electrical Engineering and Computer Science, Jan. 22, 2001, 101 pages.

Coles, Scott, "A Guide for Ensuring Service Quality in IP Voice Networks," Avaya, Inc., 2002, pp. 1-17.

Avaya, Inc., "The Advantages of Load Balancing in the Multi-Call Center Enterprise," Avaya, Inc., 2002, 14 pages.

Foster, Robin, et al., "Avaya Business Advocate and its Relationship to Multi-Site Load Balancing Applications," Avaya, Inc., Mar. 2002, 14 pages.

Chavez, David, et al., "Avaya MultiVantage Software: Adapting Proven Call Processing for the Transition to Converged IP Networks," Avaya, Inc., Aug. 2002.

Avaya, Inc., "Voice Over IP Via Virtual Private Networks: An Overview," Avaya, Inc., Feb. 2001, 9 pages.

Avaya, Inc., "Better Implementation of IP in Large Networks," Avaya, Inc. 2002, 14 pages.

Doo-Hyun Kim et al. "Collaborative Multimedia Middleware Architecture and Advanced Internet Call Center," Proceedings at the International Conference on Information Networking (Jan. 31, 2001), pp. 246-250.
"When Talk Isn't Cheap," Sm@rt Reseller, v. 3, n. 13 (Apr. 3, 2000), p. 50.
"eGain's Commerce 2000 Platform Sets New Standard for eCommerce Customer Communications," Business Wire (Nov. 15, 1999)., 3 pages.
Douglas W. Stevenson et al., "Name Resolution in Network and Systems Management Environments," available at http://netman.cit.buffalo.edu/Doc/DStevenson/NR-NMSE.html, downloaded Mar. 31, 2003, 16 pages.
Richard Shockey, "ENUM: Phone Numbers Meet the Net" www.cConvercience.com (Jul. 2001) pp. 21-30.
Bill Michael, "The Politics of Naming" www.cConvergence.com (Jul. 2001) pp. 31-35.
Sugano et al. ;"Common Presence and Instant Messaging (CPIM) Presence Information Data Format," Network Working Group (Dec. 2002), available at http://www.ieff.org/internet-drafts/draft-ietf-impp-cpim-pidf-07.txt, 26 pages.
Crocker et al.; "Common Presence and Instant Messaging (CPIM)," Network Working Group (Aug. 14, 2002), available at http://www.ieff.org/internet-drafts/draft-ietf-impp-cpim-03.txt, 33 pages.
Atkins et a.l; "Common Presence and Instant Messaging: Message Format," Network Working Group (Jan. 9, 2003), available at http://www.ieff.org/internet-drafts/draft-ietf-impp-cpim-msgfmt-08.txt, 31 pages.
Rose et al..; "The APEX Presence Service," Network Working Group (Jan. 14, 2002), available at http://www.ietf.org/internet-drafts/draft-ietf-apex-presence-06.txt, 31 pages.
Day et al.; "A Model for Presence and Instant Messaging," Network Working Group (Feb. 2000), available at http://www.ietf.org/rfc/rfc2778.txt?number=2778, 16 pages.
Day et al.; "Instant Messaging/Presence Protocol Requirements," Network Working Group (Feb. 2000), available at http://www.ietf.org/rfc/rfc2779.txt?number=2779, 25 pages.
Gulbrandsen et al.; "A DNS RR for Specifying the Location of Services (DNS SRV)," Network Working Group (Feb. 2000), available at http://www.ietf.org/rfc/rfc2782.txt?number=2782, 12 pages.
Fielding et al.; "Hypertext Transfer Protocol—HTTP/1.1," Network Working Group, Request for Comments 2068 (Jan. 1997), 152 pages.
Berners-Lee et al.; "Uniform Resource Identifiers (URI); Generic Syntax," Network Working Group, Request for Comments 2396 (Aug. 1998), 38 pages.
G. Klyne; "A Syntax for Describing Media Feature Sets," Network Working Group (Mar. 1999), available at http://www.ietf.org/rfc/rfc2533.txt?number=2533, 35 pages.
G. Klyne; "Protocol-independent Content Negotiation Framework," Network Working Group (Sep. 1999), available at http://www.ietf.org/rfc/rfc2703.txt?number=2703, 19 pages.
Holtman et al.; "Transparent Content Negotiation in HTTP," Network Working Group (Mar. 1998), available at http://www.ietf.org/rfc/rfc2295.txt?number=2295, 55 pages.
Holtman et al.; "HTTP Remote Variant Selection Algorithm—RVSA/1.0," Network Working Group (Mar. 1998), available at http://www.ietf.org/rfc/rfc2296.txt?number=2296, 13 pages.
Dawson et al.; "Vcard MIME Directory Profile," Network Working Group (Sep. 1998), available at http://www.ietf.org/rfc/rfc2426.txt?number=2426, 40 pages.
Andy Zmolek; "SIMPLE and Presence: Enterprise Value Propositions," Avaya presentation, 16 pages, presented Jan. 24, 2002.
"Call Center Software You Can't Outgrow," Telemarketing® (Jul. 1993), p. 105.
US 6,537,685, Mar. 18, 2003, (withdrawn).
U.S. Appl. No. 11/087,290, filed Mar. 22, 2005, Michaelis.
U.S. Appl. No. 11/199,828, filed Aug. 8, 2005, Bland et al.
U.S. Appl. No. 11/517,646, filed Sep. 7, 2006, Hackbarth et al.
U.S. Appl. No. 11/536,456, filed Sep. 28, 2006, Hackbarth et al.
U.S. Appl. No. 11/861,857, filed Sep. 26, 2007, Tendick et al.
A.A. Vaisman et al., "A Temporal Query Language for OLAP: Implementation and a Case Study", LNCS, 2001, vol. 2397, 36 pages.
A.B. Schwarzkopf, "Dimensional Modeling for a Data Warehouse", date unknown, 18 pages, Oct. 6, 2005.
An Expert's Guide to Oracle Technology blog, My Personal Dictionary, Lewis R. Cunningham, posted Mar. 31, 2005, http://blogs.ittoolbox.com/oracle'guide/archives003684.asp, 4 page.
ComputerWorld, ETL, M. Songini, at http://www.computerworld.com/databasetopics/businessintelligence/datawarehouse/story/....., copyright 2005, 5 pages.
Creating and Using Data Warehouse-Using Dimensional Modeling (Microsoft) downloaded May 18, 2005 http://msdn.microsoft.com/library/en-us/createdw/createdw_39z.asp?frame=true 1 page.
CS 345: Topics in Data Warehousing, Oct. 5, 2004, 36 pages.
Kimball, et al., "The Complete Guide to Dimensional Modeling." The Data Warehouse Toolkit. 2nd Edition, 2002. Ch. 11, pp. 240-241.
L. Cabibbo et al., "An Architecture For Data Warehousing Supporting Data Independence and Interoperability", International Journal of Cooperative Information Systems, Nov. 2004, 41 pages.
Multi-Dimensional Modeling with BW ASAP for BW Accelerator Business Information Warehouse, copyright 2000, 71 pages.
Snape, James, "Time Dimension and Time Zones." 2004. pp. 1-10. http://www.jamessnape.me.uk/blog/CommentView,gui,79e910a1-0150-4452-bda3-e98df.
The Importance of Data Modeling as a Foundation for Business Insight, Larissa Moss and Steve Hoberman, copyright 2004, 38 pages.
Aspect—"Analysis and Reporting," http://aspect.com/products/analysis/index.cfm, (Copyright 2005) (1 page).
Aspect—"Call Center Reports," http://aspect.com/products/analysis/ccreporting.cfm, (Copyright 2005) (2 pages).
Aspect—"Performance Optimization," http://aspect.com/products/wfm/performanceopt.cfm?section=performanceopt, (Copyright 2005) (1page).
Avaya—"Avaya and Blue Pumpkin—Providing Workforce Optimization Solutions" (Copyright 2004) (3 pages).
Avaya—"Avaya and Texas Digital Systems—Providing Real-time Access to Call Statistics" (Copyright 2004) (3 pages).
Avaya—"Avaya Basic Call Management System Reporting Desktop" (Copyright 2002) (4 pages).
Avaya—"Avaya Call Management System" (Copyright 2003) (3 pages).
Avaya—"Basic Call Management System Reporting Desktop," Product Description, http://www.avaya.com/gcm/master-usa/en-us/products/offers/bcmrs_desktop.htm (Copyright 2005) (2 pages).
Avaya—"Basic Call Management System Reporting Desktop," Product Features, http://www.avaya.com/gcm/master-usa/en-us/products/offers/bcmrs_desktop.htm (Copyright 2005) (2 pages).
U.S. Appl. No. 12/193,542, filed Aug. 18, 2008, Olson.
U.S. Appl. No. 12/242,916, filed Oct. 1, 2008, Kiefhaber et al.
Dillion, "Renaming fields and tracing dependencies", available at http://allenbrowne.com/ser-41.html, Nov. 2003, updated May 2006, 1 page.
Karakasidis A. "Queues for Active Data Warehousing", Jun. 17, 2005, Baltimore, MA, in Proceedings on Information Quality in Informational Systems (IQIS' 2005), S.28-39, ISBN: 1-59593-160-0, DOI: 10.1109/DANTE.1999.844938.
Sarda, "Temporal Issues in Data Warehouse Systems", 1999, Database Applications in Non-Traditional Traditional Environments (DANTE'99), S. 27, DOI: 10.1109/DANTE.1999.844938.
Thayer Watkins, "Cost Benefit Analysis", 1999, San Jose State University Economics Department, Web Archive http://web.arch ive.org/web/19990225143131/http://www.sjsu.edu/faculty/watkins/cba.htm.
"Learn the structure of an Access database", available at http://office.microsoft.com/en-us/access/HA012139541033.aspx, site updated Nov. 13, 2007, pp. 1-4.
U.S. Appl. No. 11/242,687, filed Oct. 3, 2005, Krimstock et al.
Koutarou, "Building a Framework for EC using Hibernate, OSWorkflow", JAVA Press, Japan, Gujutsu Hyouron Company, vol. 25, 2004, pp. 132-147, Oct. 6, 2005.
Microsoft R Access 97 for Windows R Application development guide, Ver. 8.0, Microsoft Corp., a first version, pp. 569-599, Oct. 6, 2005.

Seo, "akuto/FC shop sale assistant systme etc., compressing into halves the number of days for stock possession by a multi-bender EPR plus POS", Network Computing, Japan Licktelecom Corp., vol. 12, No. 4, Apr. 1, 2000, pp. 45-49.

Bischoff et al. "Data Ware House Building Method—practical advices telled by persons having experience and experts", Kyouritsu Shuppan Corp. May 30, 2000, first edition, pp. 197-216.

U.S. Appl. No. 09/235,065, filed Oct. 6, 2005, Denton et al.
U.S. Appl. No. 09/247,893, filed Oct. 6, 2005, Edwards et al.
U.S. Appl. No. 09/264,497, filed Oct. 6, 2005, Edwards.
U.S. Appl. No. 09/756,955, filed Oct. 6, 2005, Flockhart et al.
U.S. Appl. No. 09/420,912, filed Oct. 6, 2005, Ford.
U.S. Appl. No. 09/416,737, filed Oct. 6, 2005, Flockhart et al.
U.S. Appl. No. 10/098,824, filed Oct. 6, 2005, Flockhart et al.
U.S. Appl. No. 10/673,118, filed Oct. 6, 2005, Flockhart et al.
U.S. Appl. No. 10/673,115, filed Oct. 6, 2005, Flockhart et al.
U.S. Appl. No. 10/673,103, filed Oct. 6, 2005, Flockhart et al.
U.S. Appl. No. 10/673,105, filed Oct. 6, 2005, Flockhart et al.
U.S. Appl. No. 10/683,039, filed Oct. 6, 2005, Flockhart et al.
U.S. Appl. No. 10/099,144, filed Oct. 6, 2005, Boyer et al.
U.S. Appl. No. 10/815,534, filed Oct. 6, 2005, Flockhart et al.
U.S. Appl. No. 10/815,566, filed Oct. 6, 2005, Kiefhaber et al.
U.S. Appl. No. 10/815,584, filed Oct. 6, 2005, Kiefhaber et al.
U.S. Appl. No. 10/861,193, filed Oct. 6, 2005, Flockhart et al.
U.S. Appl. No. 10/891,346, filed Oct. 6, 2005, Flockhart et al.
U.S. Appl. No. 10/946,638, filed Oct. 6, 2005, Flockhart et al.
U.S. Appl. No. 10/000,686, filed Oct. 6, 2005, Flockhart et al.

Data Warehouse—Surrogate Keys, Keep Control Over Record Identifiers by Generating New Keys for the Data Warehouse, Ralph Kimball, May 1998, 4 pages.

Data Warehouse Designer—Design Constraints and Unavoidable Realities, No design Problem in School was This Hard, Ralph Kimball, Sep. 3, 2002, 3 pages.

Data Warehouse Designer—An Engineer' s View—Its' Worthwhile to Remind Ourselves Why We Build Data Warehouses the Way We Do, Ralph Kimball, Jul. 26, 2002, 3 pages.

Data Warehouse Designer—Divide and Conquer, Build Your Data Warehouse One Piece at a Time, Ralph Kimball, Oct. 30, 2002, 3 pages.

Data Warehouse Designer—The Soul of the Data Warehouse, Part One: Drilling Down, Ralph Kimball, Mar. 20, 2003, 3 pages.

Data Warehouse Designer—The Soul of the Data Warehouse, Part Two: Drilling Across, Ralph Kimball, Apr. 5, 2003, 3 pages.

Data Warehouse Designer—The Soul of the Data Warehouse, Part Three: Handling Time, Ralph Kimball, Apr. 22, 2003, 3 pages.

Data Warehouse Designer—Two Powerful Ideas, The Foundation for Modern Data Warehousing, Ralph Kimball, Sep. 17, 2002, 3 pages.

Data Warehouse Designer Fact Tables and Dimension, Jan. 1, 2003, http://www.inteeigententerprise.com/030101/602warehouse1_1.jhtml, Ralph Kimball, 3 page.

DEFINITY Communications System Generic 3 Call Vectoring/Expert Agent Selection (EAS) Guide, AT&T publication No. 555-230-520 (Issue 3, Nov. 1993).

DMReview—Business Dimensional Modeling: The Logical Next Step: Translating the BDM, Laura Reeves, published May 2004, 4 pages.

E. Veerman, "Designing A Dimensional Model", date unknown, 38 pages, Oct. 6, 2005.

Fundamentals of Data Warehousing—Unit 3—Dimensional Modeling, Fundamentals of Data Warehousing, copyright 2005—Evolve Computer Solutions, 55 pages.

G. Wiederhold, "Mediation to Deal with Heterogeneous Data Sources", Stanford University, Jan. 1999, 19 pages.

Glossary—Curlingstone Publishing, http://www.curlingstone.com/7002/7002glossary.html, downloaded May 24, 2005, 11 pages.

J.E. Bentley, "Metadata: Everyone Talks About It, But What Is It?", First Union National Bank, date unknown, 5 pages, Oct. 6, 2005.

Kimball, et al., "Practical Techniques for Extracting, Cleaning, Conforming, and Delivering Data." The Data Warehouse ETL Toolkit. 2004. Ch. 5 pp. 170-174.

Avaya—"Basic Call Management System Reporting Desktop," Product Overview, http://www.avaya.com/gcm/master-usa/en-us/products/offers/bcmrs_desktop.htm (Copyright 2005) (2 pages).

Avaya—"Basic Call Management System Reporting Desktop," Product Technical, http://www.avaya.com/gcm/master-usa/en-us/products/offers/bcmrs_desktop.htm (Copyright 2005) (2 pages).

Avaya—"Call Management System," Product Description, http://www.avaya.com/gcm/master-usa/en-us/products/offers/call_management_system.htm (Copyright 2005) (2 pages).

Avaya—"Call Management System," Product Features, http://www.avaya.com/gcm/master-usa/en-us/products/offers/call_management_system.htm (Copyright 2005) (3 pages).

Avaya—"Call Management System," Product Overview, http://www.avaya.com/gcm/master-usa/en-us/products/offers/call_management_system.htm (Copyright 2005) (2 pages).

Avaya—"Call Management System," Product Technical, http://www.avaya.com/gcm/master-usa/en-us/products/offers/call_management_system.htm (Copyright 2005) (2 pages).

Avaya—"Multi Channel Product Authorization," (PA) Version 5.0, (Nov. 2003) (6 pages).

Cherry, "Anger Management," IEEE Spectrum (Apr. 2005) (1 page).

NICE Systems—"Insight from Interactions," "Overwhelmed by the Amount of Data at your Contact Center?" http://www.nice.com/products/multimedia/analyzer.php, (Printed May 19, 2005) (2 pages).

NICE Systems—"Multimedia Interaction Products," "Insight from Interactions," http://www.nice.com/products/multimedia/contact_centers.php (Printed May 19, 2005) (3 pages).

Nortel—"Centrex Internet Enabled Call Centers," http://www.products.nortel.com/go/product_assoc.jsp?segld=0&parID=0&catID=-9191&rend_id... (Copyright 1999-2005) (1page).

Microsoft Office Animated Help Tool, date unknown, 1 page, Oct. 6, 2005.

"Still Leaving It to Fate?: Optimizing Workforce Management", Durr, William Jr., Nov. 2001.

G. Hellstrom et al., "RFC 2793—RTP Payload for Text Consersation," Network Working Group Request for Comments 2793 (May 2000), available at http://www.faqs.org/rfcs/rfc2793.html, 8 pages.

H. Schulzrinne et al., "RFC 2833—RTP Payload for DTMF Digits, Telephony Tones and Telephony Signals," Network Working Group Request for Comments 2833 (May 2000), available at http://www.faqs.org/rfcs/rfc2833.html, 23 pages.

"Services for Computer Supported Telecommunications Applications (CSTA) Phase III"; Standard ECMA-269, 5th Edition—Dec. 2002; ECMA International Standardizing Information and Communication Systems; URL: http://www.ecma.ch; pp. 1-666 (Parts 1-8).

"Access for 9-1-1 and Telephone Emergency Services," Americans with Disabilities Act, U.S. Department of Justice, Civil Rights Division (Jul. 15, 1998), available at http://www.usdoj.gov/crt/ada/911ta.htm, 11 pages.

Data Warehouse Designer—TCO Starts with the End User, Ralph Kimball, May 13, 2003, http://www.intelligententerprise.com/030513/608warehouse1_1.jhtml?_requestid=598425, 3 pages.

Creating and Using Data Warehouse Dimension Tables (Microsoft) copyright 2005, http://msdn.microsoft.com/library/en-us/createdw/createdw_10kz.asp?frame=true, 3 pages.

Intelligent Enterprise Magazine—Data Warehouse Designer: Fact Tables and Dimension, downloaded May 18, 2005, http://www.intelligententerprise.com/030101/602warehouse1_1.jhtml, 7 pages.

Background of the Invention for the above-captioned application (previously provided), Oct. 6, 2005.

* cited by examiner

PRIORITIZED SERVICE DELIVERY BASED ON PRESENCE AND AVAILABILITY OF INTERRUPTIBLE ENTERPRISE RESOURCES WITH SKILLS

FIELD OF THE INVENTION

The invention relates generally to contact centers and particularly to presence-enabled contact centers.

BACKGROUND OF THE INVENTION

Contact centers, such as Automatic Call Distribution or ACD systems, are employed by many enterprises to service customer contacts. A typical contact center includes a switch and/or server to receive and route incoming packet-switched and/or circuit-switched contacts and one or more resources, such as human agents and automated resources (e.g., Interactive Voice Response (IVR) units), to service the incoming contacts. As used herein, a "call" or "contact" refers to any mode or type of contact between at least two entities, including without limitation voice calls, VoIP, text-chat, instant messaging, e-mail, fax, electronic documents, webforms, voice messages, and video calls, to name but a few. Contact centers distribute contacts, whether inbound or outbound, for servicing to any suitable resource according to predefined criteria. Normally in present-day ACDs when the ACD system's controller detects that an agent has become available to handle a contact, the controller identifies all predefined contact-handling skills of the agent (usually in some order of priority) and delivers to the agent the highest-priority oldest contact that matches the agent's highest-priority skill. Agents with a higher skill are normally preferred over agents with lower skill levels when assigning an agent to a contact. When agents have multiple skills, the controller is more likely to select a contact for which the agent has a high skill level over a contact for which the agent has a lesser skill level. Generally, the only condition that results in a contact not being delivered to an available agent is that there are no contacts waiting to be handled.

Contact-distribution algorithms ultimately seek to maximize contact center performance and profitability. That may involve minimizing cost, maximizing contact throughput, and/or maximizing revenue, among others. Skills-based routing, which allows each agent to be slotted into a number of agent groups based on the agent's skill types and levels, is an attempt to maximize contact center performance and profitability. Skills-based routing systems have been further modified by introducing, as criterion in assigning work items to available agents, the service level associated with each work item.

Traditional contact centers have struggled to maintain and exceed customer service expectations, not only for wait time but also for responding effectively and efficiently to customer questions. To address wait times, contact centers have been "staffed up" by hiring additional resources at the service centers or have implemented reactive and manual processes that would involve having non-traditional resources (back office workers) alerted using manual processes to have them reactively "log in" to the resource pool. It is increasingly difficult to staff a correct number of resources to serve increasingly complex customer requests. Customers still continue to receive sub-optimal resources, busy signals, or excessive delays on IP based interactions over the web. Recently, additional manual approaches appearing in new form factors like instant messaging have been used to try and address this issue.

The fundamental problem of traditional contact centers is that resource pooling of agents and the notion of dedicated or designated call center agents is not always the most effective and efficient way to service incoming calls. Thus, it is often the case that contact centers fail to locate, let alone connect with customers, the optimal enterprise resource at any one instant. Simply put, contact centers fail to aggregate the totality of resources and skills available outside of the service center in a structured and dynamic manner.

SUMMARY

These and other needs are addressed by the various embodiments and configurations of the present invention. The present invention is directed to a presence-enabled contact center using nonagent personnel, such as experts, to service customer work items.

In one embodiment, a contact distribution methodology is employed that is presence-enabled to acquire the optimal or most appropriate skilled resource to serve a customer's immediate needs, for example, if a traditional resource is not immediately available or busy. The embodiment can allow potential skilled resources to make their availability known (e.g., "present") as either primary or "escalation" resources when the traditional contact center agents are unable or unavailable to service a contact or the skills sets available do not meet the needs of the customer. The "on-demand" resources, which are often other geographic regions, would have a high probability of being engaged in other work activities. They would thus have the option to voluntarily offer to be "interrupted" by either "accepting" or "denying" the escalated service request. An example of an "acceptance" is the following: "Though I am busy, I am interruptible." An example of a "conditional acceptance" is: "I decline to be interrupted now but I accept the contact if I can address it when I am available in 10 to 15 minutes." Finally, an example of a "denial" is: "I am busy and unable to be interrupted".

The acceptance or denial of the "on-demand" resources could be aggregated to provide the invention with an instant "inventory" of resources that can serve the escalated customer request. Customers requiring escalated service could be provided with an audio or HTML message that would inform them of the estimated (predicted) waiting time to locate and connect the best or optimal resource for their call. Customers unwilling to wait could indicate their availability for an "on-demand" conference when the best resource becomes available and would be linked to a mechanism aggregating the cumulative availability of resources that can serve the customer if more than one resource responds with "I am not interruptible now but will be available in X minutes from now". If the requests extended to the "on-demand" resources do not result in a satisfactory level of real-time or anticipated service, the customer contact could be returned to the traditional queue of agents in the contact center.

Presence-enabled "on demand" expert resources would not need to practice standard agent behaviors, such as logging in to the ACD, using AUX codes to become unavailable to calls, or remain at their desks to take calls. Yet as resources their contributions could be tracked, such as total SIP-enabled and available time, a number of support requests or invitations made to them, number of acceptable offers made by them in response to requests, number of offers accepted by the contact center, time they spend on each customer interaction, etc., so that a variety of charge-back or payment arrangements can be implemented.

The embodiment can take into consideration extended enterprise resources (knowledge worker) outside of the traditional contact center for servicing customer contacts based on the "interruptibility" of extended resources who otherwise may be engaged in other work activities. It can allow the remote worker to self-determine his participation in the escalation process. Rather than having requests "automatically" forwarded to him as in the case of agents with consequent interruption of what may be more valuable work. The embodiment can meet and exceed customer service expectations, expand the pool of available resources to serve customers at any one point in time based on spikes or bursts in demand, locate resources in real time to serve a customer contact demand regardless of the expert's physical location or status within the business, and provide a mechanism under which knowledge workers or experts control when and how they participate in the customer servicing process. As a result, the embodiment can provide reduced contact center operating costs, increased customer satisfaction levels, lower call abandonment rates, and higher levels of resource productivity.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system having an ACD or other similar contact processing switch, the invention is not limited to use with any particular type of communication system switch or configuration of system elements. Those skilled in the art will recognize that the disclosed techniques may be used in any communication application in which it is desirable to provide improved contact processing.

Figure 1:
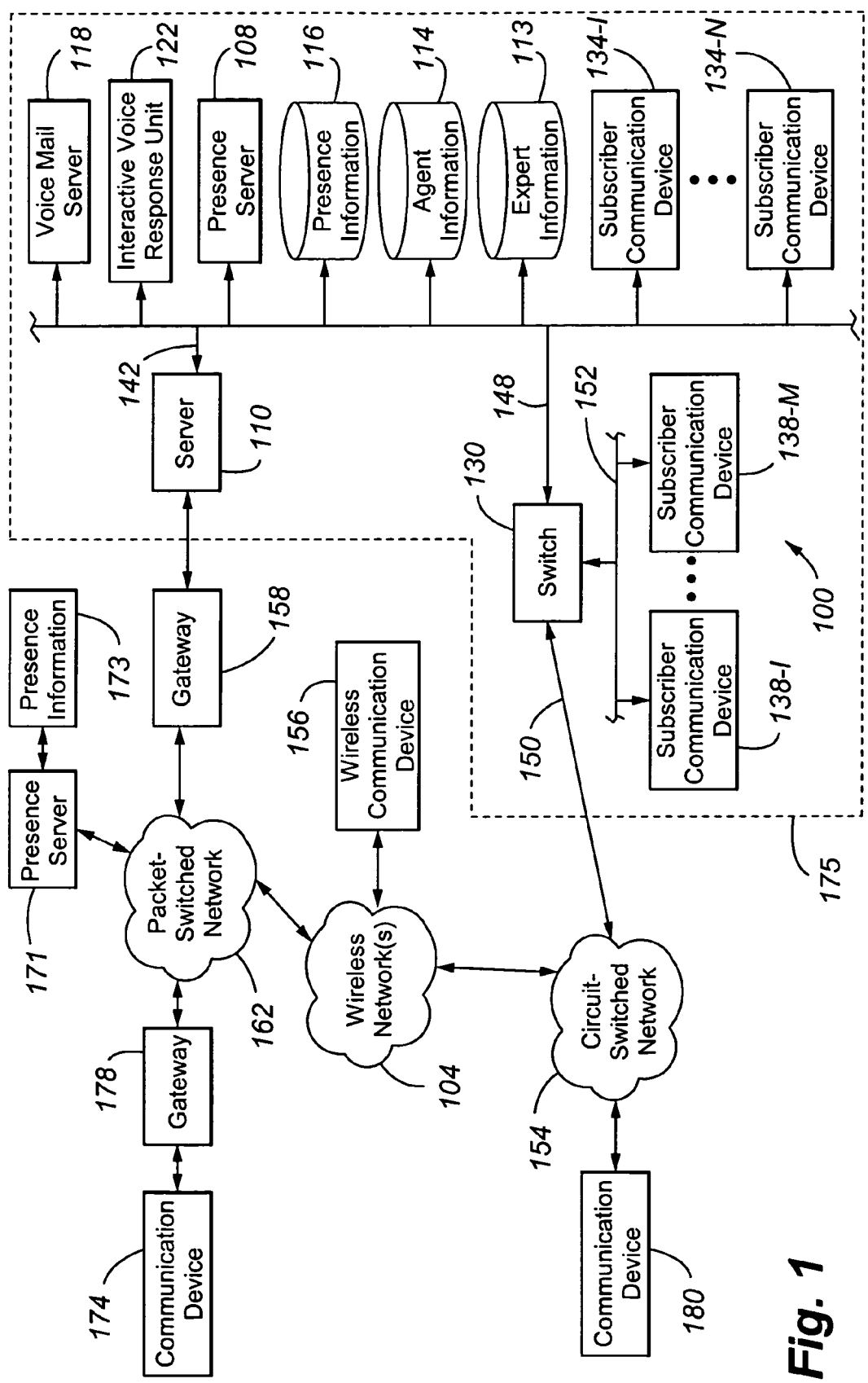
FIG. 1 is a block diagram of a call center according to an embodiment of the present invention.

FIG. 1 shows an illustrative embodiment of the present invention. A contact center 100 (or enterprise network denoted by dashed lines 175) comprises a central server 110, a set of data stores or databases 113, 114, and 116 containing contact or customer related information and other information that can enhance the value and efficiency of the contact, and a plurality of servers, namely a voice mail server 118, an Interactive Voice Response unit, or IVR 122, and a presence server 108, a switch 130, a plurality of working agents (not shown) operating packet-switched (first) telecommunication devices 134-1 to N (such as computer work stations or personal computers), and/or circuit-switched (second) telecommunication devices 138-1 to M, all interconnected by a local area network LAN (or wide area network WAN) 142. As will be appreciated, experts may also have circuit switched and/or packet switched telecommunications devices within the enterprise premises that are directly serviced by the switch/server. The servers can be connected via optional communication lines to the switch 130. The switch 130 is connected via a plurality of trunks 150 to the Public Switch Telecommunication Network or PSTN 154 and via link(s) 152 to the second telecommunication devices 138-1 to M. A gateway 158 is positioned between the server 110 and a packet-switched network 162 (such as the Internet) to process communications passing between the server 110 and the network 162.

The term "switch" or "server" as used herein should be understood to include a PBX, an ACD, an enterprise switch, an enterprise server, or other type of telecommunications system switch or server, as well as other types of processor-based communication control devices such as media servers, computers, adjuncts, etc.

External to the enterprise network 175 are the packet-switched network 162, circuit-switched network 154, and wireless network(s) 104. The packet-switched network 162 is in communication with a gateway 178 and packet-switched communication device 174. Circuit-switched network 154 is in communication with a circuit-switched communication device 180. Finally, the wireless network(s) is in communication with a wireless communication device 156 (which may be packet- and/or circuit-switched).

The gateway 158 can be any suitable protocol converter, such as Avaya Inc.'s, G700™, G600™, or MCC/SCC™ media gateway and may be implemented as hardware such as via an adjunct processor (as shown) or as a chip in the server.

The first telecommunication devices 134-1, . . . 134-N are packet-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises that are directly serviced by the switch. More particularly, these extensions correspond to conventional telecommunication device endpoints serviced by the switch/server, and the switch/server can direct incoming contacts to and receive outgoing contacts from these extensions in a conventional manner. The second telecommunication devices can include, for example, wired and wireless telephones, PDAs, H.320 video phones and conferencing units, voice messaging and response units, and traditional computer telephony adjuncts.

The agent and expert information databases 114 and 113 commonly include a profile for each agent or expert, respectively, that includes individual enterprise identifier, individual name, address, communication device information, personal information (e.g., age, sex, hobbies, physical condition, spoken languages, ethnicity, geographic area of expertise, etc.), individual skills and/or areas of expertise, and, in the case of experts, day(s) and time(s) during which and/or areas in which the expert may be contacted to service customer contacts and/or a number of times over a selected period in which the expert may be contacted to service customer contacts.

Presence information database 116 generally includes presence information for each expert available for servicing contacts. "Presence information" means any information associated with a network node and/or endpoint device, such as a communication device, that is in turn associated with a person or identity. Examples of presence information include registration information, information regarding the accessibility of the expert's endpoint device, the endpoint device's telephone number or address, the recency of use of the endpoint device by the expert, recency of authentication by the expert to a network component, the geographic location of the expert's endpoint device, the type of media, format language, session and communications capabilities of the currently available expert's communications devices, the preferences of the expert (e.g., contact mode preferences or profiles such as the communication device to be contacted for specific types of contacts or under specified factual scenarios, contact time preferences, impermissible contact types and/or subjects such as subjects about which the expert does not wish to be contacted, and permissible contact type and/or subjects such as subjects about which the expert does wish to be contacted. In one configuration, presence information includes availability information from an electronic calendar or agenda maintained by the expert in an application, such as Outlook™ by Microsoft, and accessible by the enterprise network. Presence information can be user configurable, i.e., the user can configure the number and type of communications and message devices by which they can be accessed and to define different profiles that define the communications and messaging options presented to incoming contactors in specified factual situations. The presence information can be associated with internal and external endpoints associated with each expert.

It should be noted that the invention does not require any particular type of information transport medium between switch or server and first and second telecommunication devices, i.e., the invention may be implemented with any desired type of transport medium as well as combinations of different types of transport medium.

The wireless network(s) 104 may be any packet- or circuit-switched wireless network, such as a cellular network.

The packet-switched network 162 is in communication with an external first telecommunication device 174 via a gateway 178, the circuit-switched network 154 with an external second telecommunication device 180, and the wireless network(s) 104 with the wireless communication device 156. These telecommunication devices are referred to as "external" in that they are not directly supported as telecommunication device endpoints by the switch or server. The telecommunication devices 174, 180, and 156 are examples of devices more generally referred to herein as "external endpoints." These devices can be any of the devices referred to above.

An external presence server 171 and associated presence information 173 collect presence information associated with external endpoints. The external presence server 171 may be managed by the enterprise or by a third party. The presence server 108 in the enterprise network 175 periodically queries the presence server 171 for information regarding external endpoints associated with selected experts.

In a preferred configuration, the server 110, network 162, and first telecommunication devices 134 are Session Initiation Protocol or SIP compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be emphasized that the configuration of the switch, server, user telecommunication devices, and other elements as shown in FIG. 1 is for purposes of illustration only and should not be construed as limiting the invention to any particular arrangement of elements.

As will be appreciated, the central server 110 is notified via LAN 142 of an incoming contact by the telecommunications component (e.g., switch 130, fax server, email server, web server, and/or other server) receiving the incoming contact. The incoming contact is held by the receiving telecommunications component until the server 110 forwards instructions to the component to forward or route the contact to a specific contact center resource, such as the IVR unit 122, the voice mail server 118, and/or first or second telecommunication device 134, 138 associated with a selected agent or expert. The server 110 distributes and connects these contacts to telecommunication devices of available agents and experts based on the predetermined criteria noted above. When the central server 110 forwards a voice contact (or first work item) to an agent or expert, the central server 110 may also forward customer-related information from databases 114 to the agent's or expert's computer work station or other communication device for viewing (such as by a pop-up display) to permit the agent to better serve the customer. The agents and experts process the contacts or work items sent to them by the central server 110. This embodiment is particularly suited for a Customer Relationship Management (CRM) environment in which customers are permitted to use any media to contact a business.

The switch 130 and/or server 110 can be any architecture for directing contacts to one or more telecommunication devices. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; Multi-Vantage™ PBX, CRM Central 2000 Server™, Communication Manager™, S8300™, IP600™ or S8700™ media server, and/or Avaya Interaction Center™. Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (not shown) to provide services to the serviced telecommunication devices. Other types of known switches and servers are well known in the art and therefore not described in detail herein.

The present invention generally uses agents and experts to service contacts. Agents are individuals connected to agent workstations located in the service center that typically have at least most, and more typically at least 75%, of their working time (or primary job assignment) dedicated or assigned to servicing customer contacts. Agents log in and out of one or more agent queues at the beginning and end of their shifts and have various contact center states, such as AUX for auxiliary, AVAILABLE, UNAVAILABLE or BUSY when servicing a contact, AFTER CALL WORK (ACW), while finishing up work on a completed contact, and analogs thereof. In contrast, subject matter experts or nonagents are individuals not connected to agent workstations that have at least most, and more typically at least 75%, of their working time (or primary job assignment) assigned or dedicated to activities other than servicing customer contacts. As such, they generally do not have contact center states. Unlike agents, contacts are generally not blind transferred or forced upon experts. Experts, for example, are off site sales personnel, design engineers, software developers, research and development personnel, management or supervisory personnel, manufacturing employees, sales personnel, and the like who have an expertise in a desired area, such as product or service expertise, customer expertise, and the like. Customer expertise may include a prior relationship with a customer. Experts are often associated with and reachable via internal and external endpoints while agents are reachable only via internal endpoints. Agents often have limited knowledge of various aspects of a business or subject areas while an expert has deep or extensive knowledge of one or more of these aspects or subject areas.

Subject matter experts 240 may be called upon to service contacts in a variety of situations. For example, subject matter experts 240 may be called upon to service contacts or work items if traditional customer service agents are overloaded with work items and/or to assist an agent when the subject matter of the work item is beyond the expertise of the agent. In addition, the intercept engine 232 may notify the routing agent 220 of an incoming contact originating from high priority clients or containing subject matter of interest to a matter expert 240. Thus, a customer service system is provided where the customer's inquiry is handled by an individual or individuals with the greatest amount of expertise related to the problem, thereby increasing customer satisfaction and allowing the subject matter experts 240 to gain valuable experience or knowledge from handling customer inquiries.

Because experts have job duties other than servicing contacts, experts are generally given the option of whether or not to accept a contact for servicing prior to receiving the contact. A service request or invitation is sent to the expert by any convenient media or media type. The request may include contact and/or customer information, and a reason why the expert was selected to service the contact. "Contact information" commonly includes, for an incoming contact, customer identity, customer needs, contact media type, time stamp, and the like while "customer information" commonly includes customer identity, customer personal information, customer financial information, customer type or membership class, customer sales history, customer service history, and the like. The expert may respond with an unconditional acceptance (e.g., "available to service contact now"), a conditional acceptance (e.g., "currently unavailable to service contact but will be available in 15 minutes" or "currently available to service contact only on media type X"), or a denial. When a subject matter expert declines the request to participate, he or she may be contacted at a later time and re-invited. Re-invitation may be needed when the criticality or status of the work item escalates. For example, after initial subject matter expert denial, a service agreement for the contact may be violated (due to exceeded wait times, etc.), thus the subject matter expert will be re-invited to assist and given the new status of the work item. Depending on the response, the contact routing agent 220 immediately delivers to the contact to the expert, holds, parks or queues the contact until the expert is available, or selects another expert having the appropriate media type capability.

Figure 2:
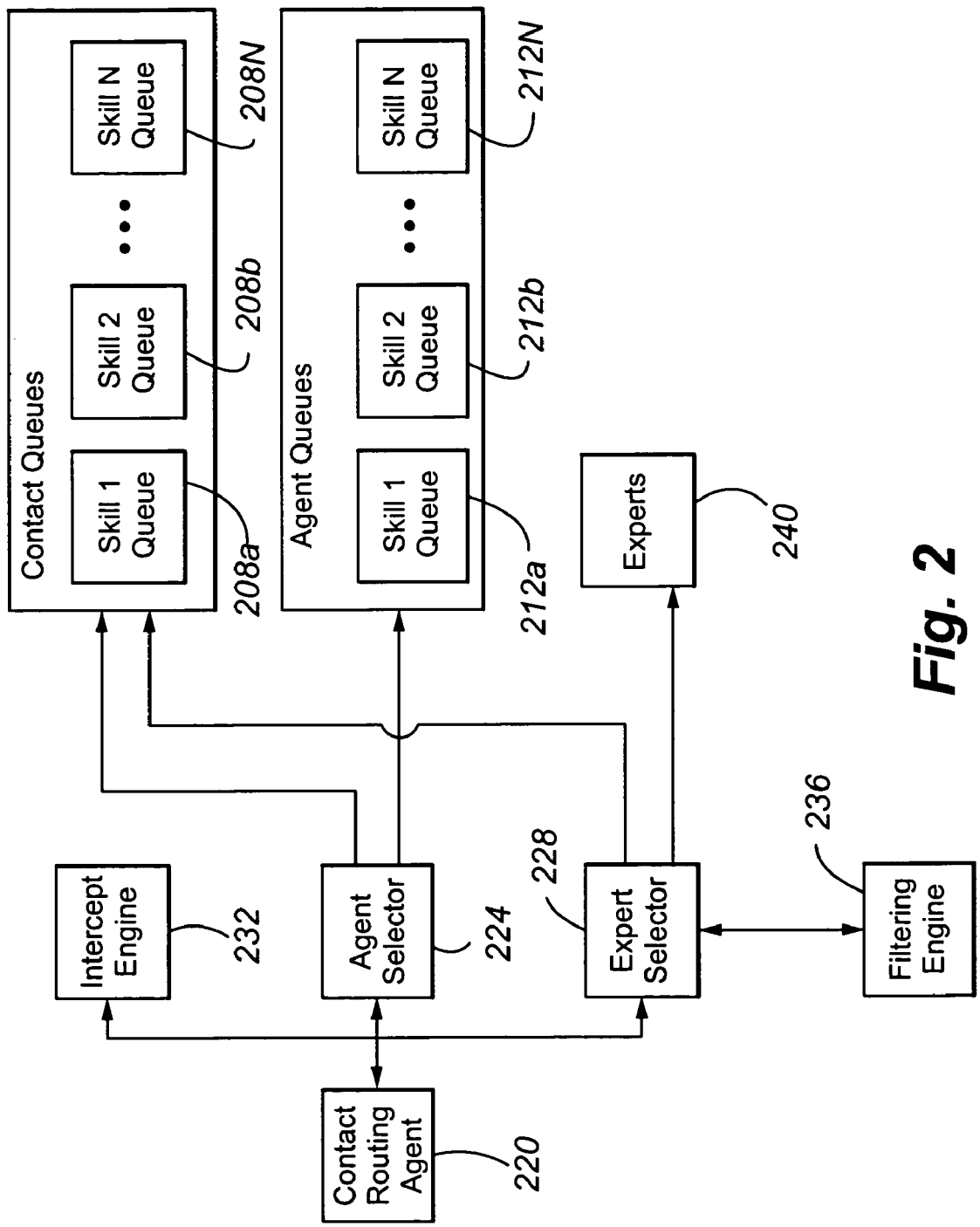
FIG. 2 is a block diagram of a server according to an embodiment of the present invention.

Referring to FIG. 2, one possible configuration of the server 110 is depicted. The server 110 is in communication with a plurality of customer communication lines (not shown) (which can be one or more trunks, phone lines, etc.) and agent and expert communication lines (not shown) (which can be a voice-and-data transmission line such as LAN 142 and/or a circuit switched voice line). Included among the data stored in the server 110 is a set of work item queues 208a-n and a separate set of agent queues 212a-n. Each work item queue 208a-n corresponds to a different set of agent skills, as does each agent queue 212a-n. Conventionally, work items are prioritized and either are enqueued in individual ones of the work item queues 208a-n in their orders of priority or are enqueued in different ones of a plurality of work item queues that correspond to a different priority. Likewise, each agent's skills are prioritized according to his or her level of expertise in that skill, and either agents are enqueued in individual ones of agent queues 212a-n in their orders of expertise level or are enqueued in different ones of a plurality of agent queues 212a-n that correspond to a skill and each one of which corresponds to a different expertise level. As will be appreciated, experts may be placed in one or more agent queues or separate queues using the same criteria. Contacts incoming to the contact center are assigned by a contact routing agent 220 to different work item queues 208a-n based upon a number of predetermined criteria, including customer identity, customer needs, contact center needs, current work item center queue lengths, customer value, and the agent skill that is required for the proper handling of the contact. Agents (or experts) who are available for handling contacts are assigned to agent queues 212a-n based upon the skills that they possess. An agent or expert may have multiple skills, and hence may be assigned to multiple agent (and/or expert) queues 212a-n simultaneously. Furthermore, an agent or expert may have different levels of skill expertise (e.g., skill levels 1-N in one configuration or merely primary skills and secondary skills in another configuration), and hence may be assigned to different agent (and/or expert) queues 212a-n at different expertise levels.

According to the invention, included among the programs executed by the processor of the server 110 are not only the contact routing agent 220 but also the agent selector 224, the expert selector 228, an intercept engine 232, and a filtering engine 236. The contact routing agent 220 directs an incoming contact either to a contact queue 208 or directly to an expert 240 and determines whether the contact is to be routed to an agent in an agent skill queue 212 or an expert 240. The agent selector 224 selects an agent to service the contact based on techniques known to those of skill in the art. The expert selector 228 selects an expert 240 to service the contact as set forth in more detail below. The intercept engine 232 flags incoming contacts, prior to queuing, that need to be directed to an expert 240. Finally, the filtering engine 236 applies predetermined filtering rules and policies to determine a set of eligible experts for consideration by the expert selector 228.

The expert selector 228 selects, from a subset of eligible experts, an expert to service an incoming or enqueued contact or assist an agent. In selecting an expert, the expert selector 228 applies policies and rules to contact, customer and expert information to select the optimal expert under the circumstances to service or assist in servicing the contact. The contact/customer information considered can include the identity of the customer making the contact, the contact type or media type, the maximum wait time tolerable to the customer, the subject area of interest to the customer, the needs of the customer, the predicted, expected or actual wait time of the contact, the customer class membership, customer-specific information, the predicted amount of time required to address the contact, and the like. The expert information considered can include the presence information associated with the selected expert, the expert information for the selected expert, the contact or media types that are available to the selected expert to service the contact, the minimum and maximum times at which the expert will be available to service contacts, and the like. In one configuration, the algorithm used for expert selection is the same as or similar to the algorithm used for agent selection. Both algorithms would employ skills-based routing techniques to direct the contact to an agent or expert.

The expert selector 228 can use a variety of techniques to notify experts of possible selection for servicing a contact. In one configuration, the experts are on a rotating list of availability, and the next listed expert is selected and requested to service the contact. In another configuration, the expert having the highest degree of expertise for the subject matter of interest to the customer or has handled the fewest contacts in a specified time period is selected and requested. In another configuration, each expert in the subset of experts is sent a request. Experts indicating that they are available for contact servicing are then further filtered to select a best fit for the contact. A final service confirmation notification is sent to the selected expert and the contact simultaneously or delivered subsequently. When only one expert at-a-time is selected and requested, the process is repeated until an expert indicates that he is available for servicing the contact. He is then sent a confirmation notification, and the contact delivered to him. In any of the above techniques, the request may be an audio message, a graphical message, or a combination thereof.

When an expert is only available in a set period of time, the customer may be queried whether he is willing to wait for the expert or prefers to be serviced immediately by a less skilled agent. If the customer opts to wait, the contact is queued until the expert is available. Alternatively, the customer may request a call back when the expert is available. In that event, a call back request is placed in a call back queue. In one configuration, the selector 228 toggles back-and-forth between the customer making the contact and one or more experts to determine which expert is best able to service the customer within the customer's time constraints.

The intercept engine maps selected contact information for each incoming contact against a set of target criteria to determine if an incoming contact should be routed directly to an expert rather than an agent. The target criteria can include customer identity, customer class, subject matter area, customer need, and the like. For example, an expert may request that any incoming contact from a specified customer or class of customer be sent directly to him. The expert may request that any incoming contact related to a specific product or product problem be sent directly to him.

The filtering engine 236 maps the customer and/or contact information against expert preferences, presence and/or expert information to exclude ineligible experts from consideration by the expert selector 228. Expert preferences or limitations include, for example, permissible times for servicing contacts, permissible customer membership classes, permissible customer identities, permissible subject matter areas, and the like. If a contact is found to be impermissible based on the expert preferences, the expert is considered to be ineligible to service the contact. In one configuration, the filtering engine 236 and not the selector 228 sends invite messages to possible eligible experts and provides the selector 228 only with those experts indicating a determined degree of availability.

Based upon the foregoing, there are a number of contact center modes of operation.

In a first "work item overflow" mode, the contact center is designed to call in subject matter experts 240 when the time to address work items in one or more queues and/or a number of work items in one or more queues exceeds a predetermined limit. This mode ensures that customer service inquiries are addressed in an acceptable amount of time. For example, when an incoming work item or an enqueued work item is subject to a service escalation such as due to a work overflow condition, the routing agent 220 requests the expert selector 228 to identify subject matter experts 240 that are available to address the work item. The work item is then directed to the available subject matter expert 240 with the highest degree of expertise in that field or, alternatively, is directed to the first available subject matter expert 240 to provide assistance. The work items may be placed in a skill queue to be addressed by the subject matter expert 240 in order of receipt.

In a second "intercept" mode of operation, the subject matter expert 240 is able to intercept work items of a specific nature or from a specific customer. More specifically, some work items are important to subject matter experts 240, because, for example, they originate from a valued customer or are concerned with a certain type of hardware or problem handled routinely by the subject matter expert 240. The subject matter expert 240 can alter his or her expert information to identify the conditions wherein certain work items will be sent directly to him, thereby bypassing any agent interaction. The advantage of this mode is that subject matter experts may provide a high level of customer service to their important clients. In addition, one skilled in the art will appreciate that subject matter experts who develop products may be interested in how a certain product is being used in real world situations. For example, the identification of software problems, i.e. bugs, may be more quickly addressed. The ability to intercept specific product-related questions may also identify the need to create additional frequently asked question hyperlinks on a website, for example.

In yet a third "agent assistance" mode of operation, a servicing agent requests assistance from a subject matter expert when the subject matter of the work item is directed to subject matter outside the expertise of the agent. One skilled in the art will appreciate that this situation may occur when the agent initially addressed the work item but discovers during further investigation of the client's problem, that the problems posed were not accurately characterized by the contact center, thereby creating a situation where the agent is unable to address the problem. Embodiments of the present invention may also include the ability for the agent to provide the subject matter expert a time estimate of how long it will take to rectify the complex work item. More specifically, when a subject matter expert is invited to interrupt his/her current activities to aid an agent, the subject matter expert may be given an estimated duration of the interruption. This duration information will help the subject matter expert decide whether to accept or decline the request for assistance. The estimated duration may be derived from the average handling times of similar work items or from alternate methods known in the art. One skilled in the art will appreciate that this aspect of the invention may be employed in the work item overflow and intercept modes of operation as well.

It is still yet another mode of operation that allows subject matter experts to participate in a follow-up fashion. More specifically, it is often desirable to identify certain clients or work items involving certain issues, for enhanced service, wherein the subject matter expert contacts the customer as a follow-up to ensure that the work item was sufficiently addressed. One skilled in the art will appreciate that again, the follow-up criteria may allow subject matter experts to opt into the system by a volunteer basis, customer basis, problem basis, etc. One advantage of this would be to allow for the subject matter expert to follow up with a particular client, build a rapport with that client, and have a continued relationship with that client wherein future work items generated by that client may be intercepted by the subject matter expert. Thus, the subject matter expert helps build confidence in the company by catering to a certain group of clients.

A volunteer mode is also contemplated that allows subject matter experts to volunteer to address random customer service inquiries, i.e. become "agents". This mode allows the subject matter experts to increase their customer service skills and to have more customer interaction. In addition, this option is desirable to the company such that the time customers spend in agent queues would be reduced since the amount of agents would increase from time to time. In addition, it should be understood by one skilled in the art that subject matter experts may log in to volunteer to assist agents when the subject matter expert's work load is low, thus increasing employee productivity.

Figure 3:
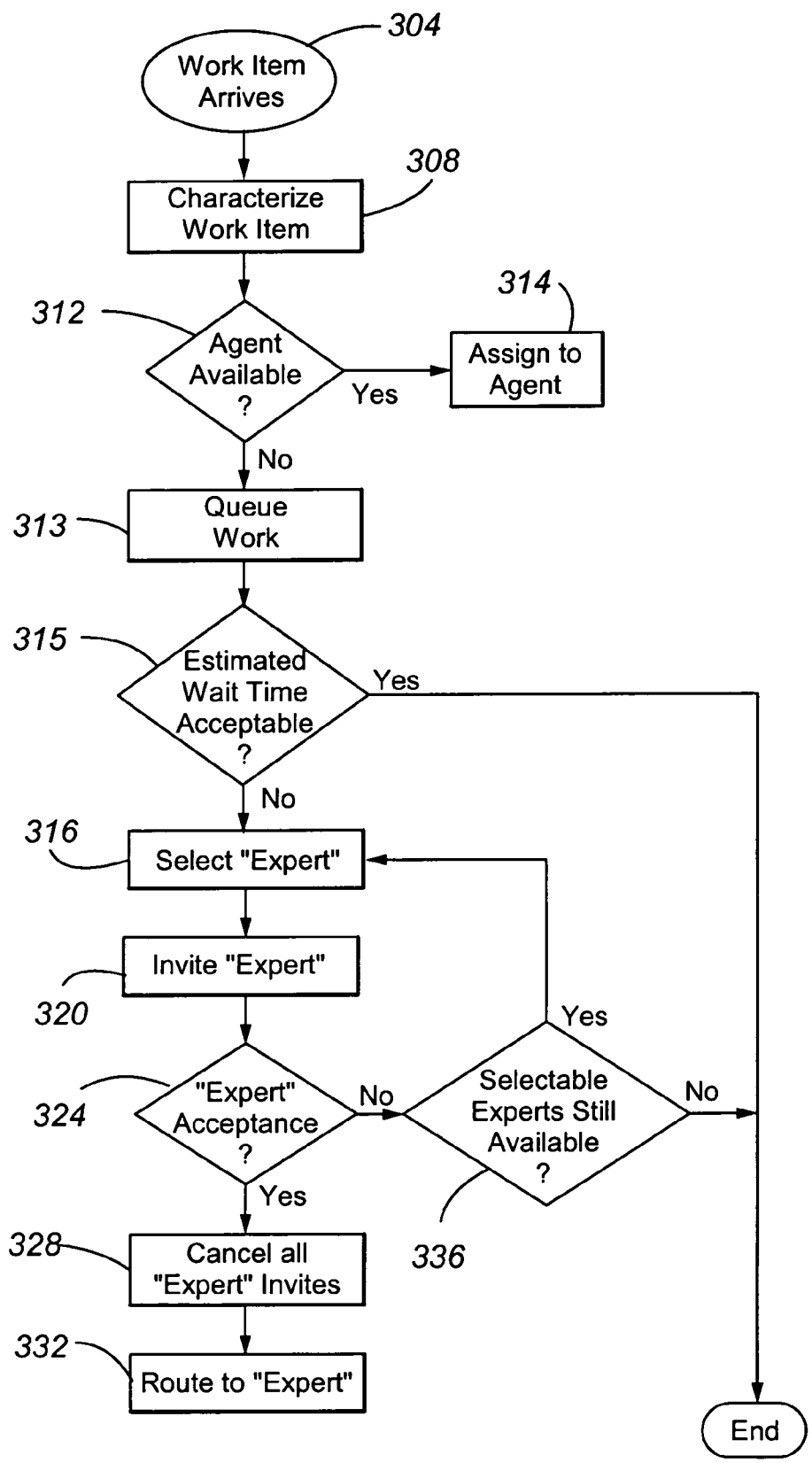
FIG. 3 is a flow chart according to an embodiment of the present invention.

Referring now to FIG. 3, a flowchart is shown that illustrates the "overflow" mode. When a work item initially arrives at step 304, it is characterized in step 308 to identify the subject matter level of difficulty, time to answer, etc. Characterization may be performed by the IVR unit 122, a human agent, content analysis, DNIS or sending address analysis, and the like. Next, the system assesses the availability of agents in decision diamond 312. If there is an agent available to service the work item immediately or a skill queue of agents to service the work item within a predetermined time frame, the work item, in step 314, is assigned to the agent or is placed in the agent queue. If however, an agent is not available immediately or if wait times of the skill queue exceed a predetermined level, the router 220 instructs the selector 228 to select a subject matter expert to service the work item in step 316. More specifically, if the agent is not immediately available, the work item is queued 313. The system next assesses the estimated wait time in decision diamond 315. If the wait time is not acceptable, the work item is routed to the selected expert 316. If subject matter experts are available as identified by the presence information and as described above, individual experts are invited in step 320 to service the work item. Here, embodiments of the present invention utilize a call to the subject matter expert, a pop up screen on the subject matter expert's computer, a page, a call to the subject matter expert's cellphone, or any other similar way to contact the expert to invite them to assist the agents. In decision diamond 324, the invited expert(s) may accept, decline, or accept with a condition. if the invited expert(s) accept unconditionally or conditionally with an acceptable condition, the other requests or invitations for assistance to all other subject matter experts are cancelled or retracted in step 328, and the contact is routed to the accepting expert in step 332. If the invited expert(s) decline or conditionally accept with unacceptable conditions, the selector 228 proceeds to decision diamond 336 and searches for other available experts 240. if no further experts can be identified, the selector 228 proceeds to decision diamond 312. If one or more further experts are identified, the selector 228 proceeds to and repeats step 320. One skilled in the art will appreciate that a parallel approach may be used where many experts are invited at one time as described above. In one configuration, if no experts are available in decision diamond 336, the work item is directed to the appropriate agent queue.

Figure 4:
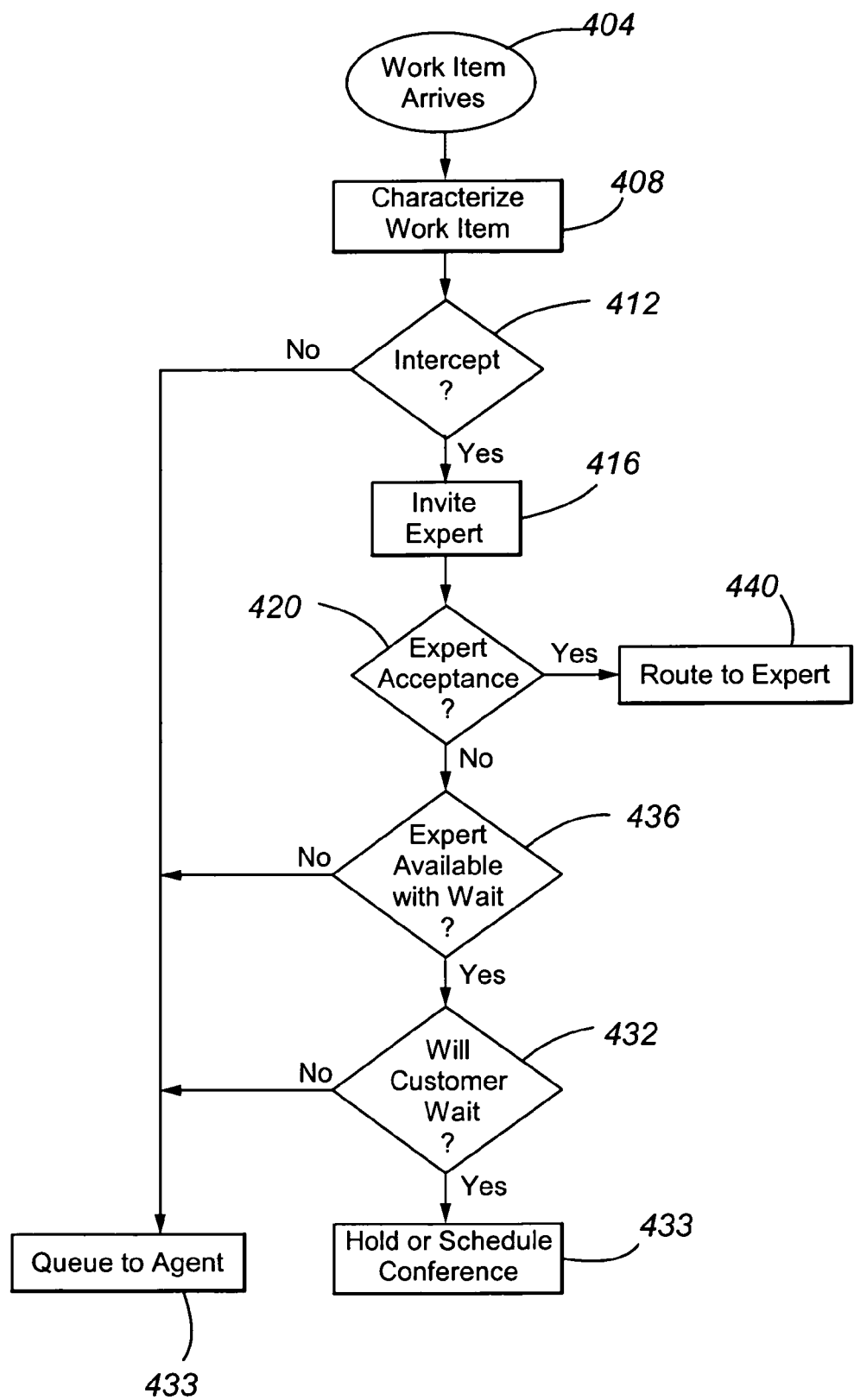
FIG. 4 is a flowchart according to an embodiment of the present invention.

Referring now to FIG. 4, the "intercept" mode is illustrated. The work item arrives in step 404 and is characterized in step 408 to identify the subject matter thereof and other relevant information. In decision diamond 412, the intercept engine 232 compares the contact information of the work item with target criteria that has been identified to initiate re-direction of an incoming work item. If the comparison finds a match, the identified expert is invited in step 416 to service the work item. As noted, the expert in decision diamond 420 may accept conditionally or unconditionally or decline. If the expert accepts unconditionally or with an acceptable condition, the work item is routed to the expert in step 440. If the expert declines or accepts conditionally with an unacceptable condition, the selector 228 proceeds to decision diamond 436. If the condition is a wait time before the expert is available to service the contact, the selector 228 proceeds to decision diamond 432. In decision diamond 432, the customer is queried whether she would like to wait for the expert to be available to service her contact. If so, the work item, in step 433 is parked, held, or placed in a queue or a conference is scheduled with the expert. If however, the customer does not wish to wait to talk to the expert, if the contact is not to be intercepted in decision diamond 412, or if the expert declines to service the contact in decision diamond 436, the contact, in step 433, is queued in a contact queue to await servicing by an agent.

Figure 5:
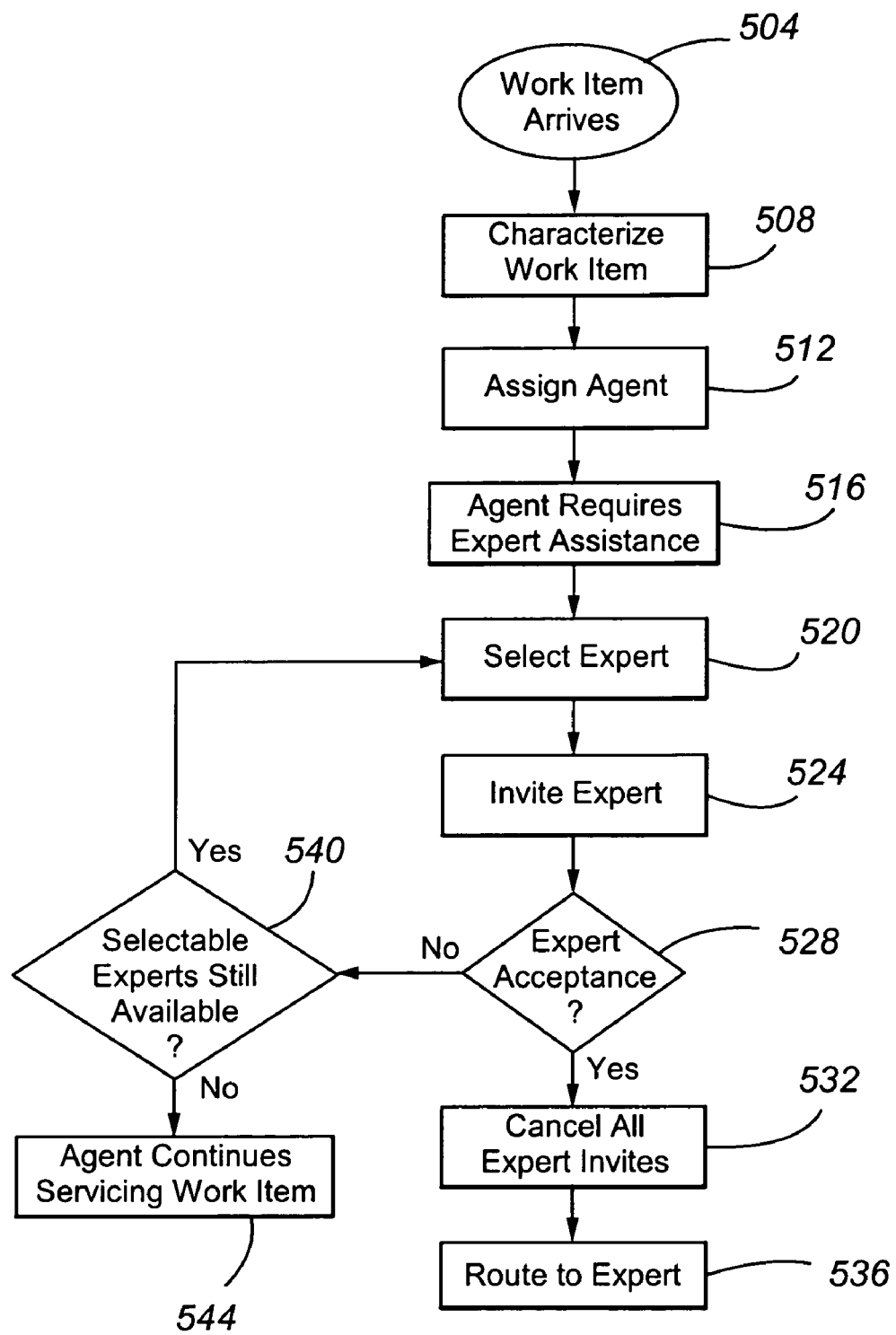
FIG. 5 is a flow chart according to an embodiment of the present invention.

Referring now to FIG. 5, the "agent assistance" mode of operation is shown. Here, as in traditional call center systems, the work item arrives in step 504, is characterized in step 508, and assigned to an agent in step 512. During the course of servicing the work item, the agent decides, in step 516, to ask a subject matter expert for assistance. In step 520, an expert or group of experts is selected based, inter alia, on the subject matter of the work item and the skills of a subject matter expert. Once the subject matter expert is identified, he or she is invited in step 524 to assist the agent in resolving the work item. If, in decision diamond 528, the expert accepts unconditionally or conditionally with acceptable conditions, all other invitations are canceled in step 532, and, in step 536, the contact is routed to the accepting expert. Alternatively, the expert may be conferenced in with the agent and the customer. If, in decision diamond 528, the expert declines or accepts conditionally with an unacceptable condition, the selector 228, in decision diamond 540, determines whether any potentially selectable experts are still available. If so, the selector 228 proceeds to and repeats step 520. if not, the agent continues servicing the contact without assistance.

A number of variations and modifications of the invention can be used. It would be possible to provide for some features of the invention without providing others.

For example in one alternative embodiment, the various components or modules can be implemented as hardware or software or a combination thereof and can be implemented in different ways. For example, the steps noted above for each module can be performed by other modules, depending on the application.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. In a contact center, the contact center comprising at least one work item queue, at least one agent queue for servicing the at least one work item queue, the at least one agent queue being associated with a plurality of agents, a method for servicing contacts, comprising:
    a processor determining whether an agent is available to service a selected work item;
    if an agent is available, the processor assigning the selected work item to the agent;
    if the agent is not available, the processor determining that the selected work item is to be serviced by a selected expert, the selected expert being a third party that is different from the plurality of agents;
    the processor determining presence information associated with the selected expert, the presence information indicating a current availability of the selected expert for receiving a contact;
    the processor determining that the selected expert is currently available to receive a contact;
    the processor inviting the selected expert to service the work item; and
    the processor determining if the selected expert has accepted the invitation, wherein determining if the selected expert has accepted the invitation comprises:
    the processor receiving a conditional acceptance of the invitation from the selected expert, the conditional acceptance indicating that the selected expert will be available to service the contact at a stated period of time and on a specified media type,
    the processor querying a customer associated with the work item whether or not the customer may wait the stated period of time for the work item to be serviced; and
    the processor applying the following rules:
    when the customer is willing to wait, the processor directing the work item to the selected expert for servicing; and
    when the customer is unwilling to wait, the processor not directing the work item to the selected expert for servicing.

2. The method of claim 1, wherein at least most of the expert's work hours are not dedicated to servicing work items, wherein at least most of each agent's work hours are dedicated to servicing work items, wherein the selected expert does not log into a call center component, and does not use auxiliary codes to become unavailable to calls, wherein the agents log into the call center component and use auxiliary codes to become unavailable to calls, and wherein the selected expert is contacted, when inviting the selected expert to service the work item, via an external endpoint.

3. The method of claim 1, wherein determining that a the selected work item is to be serviced by a selected expert comprises:
    the processor determining that the selected work item is a type of work item subject to a service escalation condition, wherein the service escalation condition results from a number of work items of the type of work item waiting to be serviced being in excess of a first selected threshold, the type of work item having a wait time in excess of a second selected threshold, and/or the selected work item has a wait time in excess of a third selected threshold; and
    in response to determining that the selected work item is a type of work item subject to a service escalation condition, the processor determining that the selected work item is to be serviced by the selected expert rather than an agent.

4. The method of claim 1, wherein determining that a the selected work item is to be serviced by a selected expert is performed before the selected work item is queued and wherein the presence information comprises a plurality of registration information, information regarding the accessibility of the selected expert's endpoint device, a recency of use of the endpoint device by the expert, a recency of authentication by the selected expert to a network component, the geographic location of the selected expert's endpoint device, a type of media used by the selected expert's endpoint device, contact preferences of the selected expert, and entries in the selected expert's electronic calendar.

5. The method of claim 1, wherein determining that the selected work item is to be serviced by a selected expert is performed after the selected work item is at least partially serviced by an agent, wherein the invitation comprises contact information associated with the work item, and wherein the contact information comprises customer identity, customer needs, contact media type, and time stamp.

6. The method of claim 1, wherein the invitation comprises contact information associated with the work item, customer information associated with the work item, and a reason why the expert was selected to service the contact, wherein the contact information comprises a plurality of customer identity, customer needs, contact media type, and time stamp, and wherein customer information comprises a plurality of customer identity, customer personal information, customer financial information, customer wait time preferences, customer type or class membership class, customer sales history, and customer service history.

7. The method of claim 1, wherein the presence information comprises a plurality of registration information associated with the selected expert, information regarding the accessibility of an endpoint device associated with the selected expert, a recency of use of the endpoint device by the selected expert, a recency of authentication by the selected expert to a network component, a geographic location of the selected expert's endpoint device, a type of media capability of the selected expert's endpoint device, session and communications capabilities of the endpoint devices associated with the selected expert, one or more preferences of the selected expert, and an electronic calendar maintained by the selected expert.

8. The method of claim 1, wherein determining that the selected work item is to be serviced by a selected expert comprises the sub-steps:

the processor determining, by an intercept engine, that the selected work item is to be serviced by an expert rather than an agent, the intercept engine mapping contact information for the selected work item against a set of target criteria;

the processor determining, by a filtration engine, a set of experts eligible to service the selected work item, the selected expert being a member of the expert set, wherein the filtration engine maps customer and/or contact information associated with the selected work item against expert preferences, presence information, and/or expert information; and the processor selecting, by an expert selector, a subset of the set of experts, the subset comprising the selected expert, wherein at least one of the following is used to select the expert subset: a rotating list of availability, a degree of expertise of the members of the expert set, and a level of responsiveness and/or availability of the members of the expert set.

9. The method of claim 1, wherein, in determining that the selected expert is currently available to receive a contact, a plurality of selected experts are simultaneously or substantially simultaneously invited to service the work item and further comprising:

the processor selecting the expert based on expert preferences, the preferences comprising at least one of permissible times for servicing contacts, permissible customer membership classes, permissible customer identities, permissible expected handle time duration, and permissible subject matter areas.

10. The processor executing instructions for performing the steps of claim 1.

11. A contact center, comprising:
a memory;
at least one work item queue;
at least one agent queue for servicing the at least one work item queue, the at least one agent queue being associated with a plurality of agents;
a processor operable to:
determine that a selected work item is to be serviced by a selected expert, the selected expert being different from the plurality of agents, wherein determining that a the selected work item is to be serviced by a selected expert is performed before the selected work item is queued;
access a third party presence server, wherein the third party presence server stores presence information for the selected expert;
retrieve presence information from the third party presence server;
determine presence information associated with the selected expert, the presence information indicating a current availability of the selected expert for receiving a contact;
determine that the selected expert is currently available to receive a contact;
in response to determining that the selected expert is currently available, invite the selected expert to service the work item; and
determine if the selected expert has accepted the invitation, wherein determining if the selected expert has accepted the invitation comprises:

the processor receiving a conditional acceptance of the invitation from the selected expert, the conditional acceptance indicating that the selected expert will be available to service the contact at a stated period of time and on a specified media type, the processor querying a customer associated with the work item whether or not the customer may wait the stated period of time for the work item to be serviced; and the processor applying the following rules:
when the customer is willing to wait, the processor directing the work item to the selected expert for servicing; and
when the customer is unwilling to wait, the processor not directing the work item to the selected expert for servicing.

12. The contact center of claim 11, wherein at least most of the expert's work hours are not dedicated to servicing work items, wherein at least most of each agent's work hours are dedicated to servicing work items, wherein the selected expert does not log into a call center component, and does not use auxiliary codes to become unavailable to calls, wherein the agents log into the call center component and use auxiliary codes to become unavailable to calls, and wherein the selected expert is contacted in operation (iv) via an external endpoint.

13. The contact center of claim 11, wherein determining that a selected work item is to be serviced by a selected expert, the selected expert being different from the plurality of agents comprises:

determining that the selected work item is a type of work item subject to a service escalation condition, wherein the service escalation condition results from a number of work items of the type of work item waiting to be serviced being in excess of a first selected threshold, the type of work item having a wait time in excess of a second selected threshold, the time to address the work item exceeds a third selected threshold, the predicted time to address the work item exceeds a fourth selected threshold, and/or the selected work item has a wait time in excess of a fifth selected threshold.

14. The contact center of claim 11, wherein the presence information comprises a plurality of registration information, information regarding the accessibility of the selected expert's endpoint device, a recency of use of the endpoint device by the expert, a recency of authentication by the selected expert to a network component, the geographic location of the selected expert's endpoint device, a type of media used by the selected expert's endpoint device, contact preferences of the selected expert, and entries in the selected expert's electronic calendar.

15. The contact center of claim 11, wherein the invitation comprises contact information associated with the work item, and wherein the contact information comprises customer identity, customer needs, contact media type, and time stamp.

16. The contact center of claim 11, wherein the invitation comprises at least one of contact information associated with the work item, customer information associated with the work item, expected handling time of the work item, and a reason why the expert was selected to service the contact, wherein the contact information comprises a plurality of customer identity, customer needs, contact media type, and time stamp, and wherein customer information comprises a plurality of customer identity, customer personal information, customer financial information, customer wait time preferences, customer type or class membership class, customer sales history, and customer service history.

17. The contact center of claim 11, wherein the presence information comprises a plurality of registration information associated with the selected expert, information regarding the accessibility of an endpoint device associated with the selected expert, a recency of use of the endpoint device by the selected expert, a recency of authentication by the selected expert to a network component, a geographic location of the endpoint device, a type of media capability of the selected expert's endpoint device, session and communications capabilities of the various endpoint devices associated with the selected expert, one or more preferences of the selected expert, and an electronic calendar maintained by the selected expert.

18. The contact center of claim 11, in determining that a selected work item is to be serviced by a selected expert, the selected expert being different from the plurality of agents, the processor performs the following instructional modules:
    an intercept module to determine that the selected work item is to be serviced by an expert rather than an agent, the intercept engine mapping contact information for the selected work item against a set of target criteria;
    a filtration module to determine that a set of experts eligible to service the selected work item, the selected expert being a member of the expert set, wherein the filtration engine maps customer and/or contact information associated with the selected work item against expert preferences, presence information, and/or expert information; and
    an expert selector to determine a subset of the set of experts, the subset comprising the selected expert, wherein at least one of the following is used to select the expert subset: a rotating list of availability, a degree of expertise of the members of the expert set, and a level of responsiveness and/or availability of the members of the expert set.

19. The contact center of claim 11, wherein, in determining that the selected expert is currently available to receive a contact, a plurality of selected experts are simultaneously or substantially simultaneously invited to service the work item and wherein the processor is further operable to select the expert based on expert preferences, the preferences comprising at least one of permissible times for servicing contacts, permissible customer membership classes, permissible customer identities, permissible expected handle time duration, and permissible subject matter areas.

20. The contact center of claim 11, wherein time the expert spends addressing the work item is tracked and further comprising re-inviting the selected expert if he or she does not accept the invitation.

21. The method of claim 1, wherein the selected work item is to be serviced by the selected expert for at least one of the following reasons:
    a time to address work items in one or more queues exceeds a predetermined limit;
    a number of work items in one or more queues exceeds a predetermined limit;
    the selected expert has identified conditions requiring the selected work item to be sent directly to the selected expert rather than an agent; and
    an agent servicing the work item requests assistance from a subject matter expert.

22. In a contact center, the contact center comprising at least one work item queue, at least one agent queue for servicing the at least one work item queue, the at least one agent queue being associated with a plurality of agents, a method for servicing contacts, comprising:
    a processor receiving a selected work item from a customer;
    the processor assigning the selected work item to the agent, wherein the agent partially services the selected work item;
    after the selected work item is partially serviced, the processor determining that the selected work item is to be serviced by a selected expert, the selected expert being a third party that is different from the plurality of agents;
    the processor determining presence information associated with the selected expert, the presence information indicating a current availability of the selected expert for receiving a contact;
    the processor determining that the selected expert is currently available to receive a contact the processor inviting the selected expert to service the partially serviced work item; and
    the processor determining if the selected expert has accepted the invitation, wherein determining if the selected expert has accepted the invitation comprises:
    the processor receiving a conditional acceptance of the invitation from the selected expert, the conditional acceptance indicating that the selected expert will be available to service the contact at a stated period of time and on a specified media type,
    the processor querying a customer associated with the partially service work item whether or not the customer may wait the stated period of time for the partially service work item to be serviced; and
    the processor applying the following rules:
    when the customer is willing to wait, the processor directing the partially service work item to the selected expert for servicing; and
    when the customer is unwilling to wait, the processor not directing the partially service work item to the selected expert for servicing.

* * * * *